US012570514B2

(12) United States Patent
Yong et al.

(10) Patent No.: US 12,570,514 B2
(45) Date of Patent: Mar. 10, 2026

(54) COLD-WATER GENERATING APPARATUS AND WATER PURIFIER COMPRISING SAME

(71) Applicant: COWAY CO., LTD., Gongju-si (KR)

(72) Inventors: Min Chul Yong, Gongju-si (KR); Chung Rae Kim, Gongju-si (KR); Jeong Yeon Kim, Gongju-si (KR); In Du Choi, Gongju-si (KR); Chan Jung Park, Gongju-si (KR)

(73) Assignee: COWAY CO., LTD., Gongju-si (KR)

( * ) Notice: Subject to any disclaimer, the term of this patent is extended or adjusted under 35 U.S.C. 154(b) by 221 days.

(21) Appl. No.: 18/259,910

(22) PCT Filed: Dec. 1, 2021

(86) PCT No.: PCT/KR2021/018038
§ 371 (c)(1),
(2) Date: Jun. 29, 2023

(87) PCT Pub. No.: WO2022/145761
PCT Pub. Date: Jul. 7, 2022

(65) Prior Publication Data

US 2024/0051813 A1 Feb. 15, 2024

(30) Foreign Application Priority Data

Dec. 30, 2020 (KR) ........................ 10-2020-0187670

(51) Int. Cl.
*B67D 1/08* (2006.01)
*B67D 1/00* (2006.01)

(52) U.S. Cl.
CPC ......... *B67D 1/0869* (2013.01); *B67D 1/0014* (2013.01); *B67D 2210/0001* (2013.01); *B67D 2210/00049* (2013.01)

(58) Field of Classification Search
CPC ................ B67D 1/0869; B67D 1/0014; B67D 2210/0001; B67D 2210/00049;
(Continued)

(56) References Cited

U.S. PATENT DOCUMENTS 4,494,380 A * 1/1985 Cross ........................ F01N 3/00 62/3.2
4,829,771 A * 5/1989 Koslow ................... F25B 21/02 62/3.64
(Continued)

FOREIGN PATENT DOCUMENTS

DE 10 2012 012 447 A1 1/2014
EP 3 674 630 A1 7/2020
(Continued)

OTHER PUBLICATIONS

International Search Report mailed on Mar. 24, 2022 in PCT/KR2021/018038 filed on Dec. 1, 2021 (2 pages).
(Continued)

*Primary Examiner* — Bob Zadeh
(74) *Attorney, Agent, or Firm* — Oblon, McClelland, Maier & Neustadt, L.L.P.

(57) ABSTRACT

The present invention relates to a cold-water generating apparatus and a water purifier comprising same, in which: by arranging a block member to surround the outer circumferential surface of a flow path member through which fluid flows, and cooling the block member so that the fluid is cooled, thereby sufficiently lowering the temperature at which the fluid is cooled; and by arranging cooling passages respectively in a plurality of zones provided in the block member and thermally separated from one another, providing a connection pipe to allow the fluid to sequentially flow through the cooling passages, and preventing heat exchange from occurring between the fluid introduced through the connection pipe and the fluid discharged therefrom, the
(Continued)

FIG. 4 maximum amount of cold water can be secured, thereby improving user satisfaction.

15 Claims, 22 Drawing Sheets

(58) Field of Classification Search
CPC ........... B67D 2210/00002; B67D 2210/00047; F25B 2321/023; F25B 21/02; H10N 10/10
See application file for complete search history.

(56) References Cited

U.S. PATENT DOCUMENTS

| | | | | |
|---|---|---|---|---|
| 5,561,981 | A * | 10/1996 | Quisenberry | H10N 10/13 62/3.5 |
| 2018/0105410 | A1* | 4/2018 | Kim | F25D 31/006 |
| 2024/0051813 | A1* | 2/2024 | Yong | B67D 1/0014 |

FOREIGN PATENT DOCUMENTS

| | | | | |
|---|---|---|---|---|
| JP | 2013-142524 | A | 7/2013 | |
| KR | 10-2013-0001910 | A | 1/2013 | |
| KR | 20130001910 | A * | 1/2013 | F25D 29/00 |
| KR | 10-1262719 | A | 5/2013 | |
| KR | 10-2013-0140921 | A | 12/2013 | |
| KR | 20130140921 | A * | 12/2013 | C02F 1/003 |
| KR | 10-2014-0098017 | A | 8/2014 | |
| KR | 10-1435108 | A | 8/2014 | |
| KR | 20140098017 | A * | 8/2014 | F25D 23/003 |
| KR | 10-2016-0097758 | A | 8/2016 | |
| KR | 10-2018-0029467 | A | 3/2018 | |
| KR | 10-2018-0040954 | A | 4/2018 | |
| KR | 10-2020-0106673 | A | 9/2020 | |
| WO | WO-2015108380 | A1 * | 7/2015 | H10N 10/81 |
| WO | WO-2019151652 | A1 * | 8/2019 | B67D 1/0869 |
| WO | WO-2020175832 | A1 * | 9/2020 | F25D 11/02 |
| WO | WO 2020/222487 | A1 | 11/2020 | |

OTHER PUBLICATIONS

Extended European Search Report issued Oct. 1, 2024 in European Patent Application No. 21915559.5, 9 pages.

* cited by examiner 110 (111, 112)

COLD-WATER GENERATING APPARATUS AND WATER PURIFIER COMPRISING SAME

CROSS-REFERENCE TO RELATED APPLICATIONS

This application claims priority to and the benefit of Korean Patent Application No. 10-2020-0187670, filed on Dec. 30, 2020, the disclosure of which is incorporated herein by reference in its entirety.

TECHNICAL FIELD

The present invention relates to a cold-water generating apparatus and a water purifier comprising the same, in which: by arranging a block member to surround the outer circumferential surface of a flow path member through which fluid flows, and cooling the block member so that the fluid is cooled, thereby sufficiently lowering the temperature at which the fluid is cooled; and by arranging cooling passages respectively in a plurality of zones provided in the block member and thermally separated from one another, providing a connection pipe to allow the fluid to sequentially flow through the cooling passages, and preventing heat exchange from occurring between the fluid introduced through the connection pipe and the fluid discharged therefrom, the maximum amount of cold water can be secured, thereby improving user satisfaction.

BACKGROUND ART

In general, the apparatus for generating cold water is an apparatus for cooling water which is supplied from a faucet or bottled water and providing the same to a user. Such a cold-water generating apparatus is mainly installed for generating low-temperature drinking water, such as a water purifier, a carbonated water machine, a cold/hot water machine and the like, but it may be used in various fields requiring the generation of cold water.

European Patent Publication No. 3674630 of Coway Co., Ltd. discloses a conventional water purifier. The water purifier is provided with an internal space, a tank body having inlet and outlet ports formed therein, a thermoelectric module for cooling the water contained in the tank body, and a cold sink for transferring cold air from the thermoelectric module to the tank body. In this case, the cold sink is arranged on one side of the tank body and is configured to cool the water accommodated inside the tank body, and in this way, since cold water is generated without a separate compartment inside the tank body, there is a problem in that the cooling efficiency of the cold water is lowered because the relatively high-temperature water obtained and the cooled cold water continuously exchange heat.

The cold water-generating apparatus disclosed in Korean Patent Application Laid-Open No. 10-2013-0001910 of Coway Co., Ltd. discloses a flow path that is partitioned on a plane, a block member surrounding the planar flow path, and a thermoelectric module that is disposed on one side of the block member. According to this structure, there is an advantage in that cooling efficiency is improved because it is difficult to mix inflow water and cooled water due to the partitioned flow path. However, there is a problem in that it is difficult to maintain the cool air of cold water near the inlet because the amount of water accommodated by the planar partitioned flow path is limited and the area to be cooled by a single thermoelectric module is wide.

In the cold water-generating apparatuses disclosed in Korean Patent Application Laid-Open No. 10-1262719 of Young-man PARK and Korean Patent Application Laid-Open No. 10-2014-0098017 of Revotech Co., Ltd., disclosed is a plurality of thermoelectric modules in which a plurality of block members respectively including a flow path that are partitioned by a plane are stacked, and are coupled to each block member. According to this structure, since the plurality of flow paths are respectively cooled, there are advantages in that the amount of chilled water can be increased to some extent and cooling performance is improved. However, since the planar partition flow path is still used, the amount of cold water is limited, and in order to increase the amount of cold water, the width of the block member must be increased, thereby reducing cooling performance. Moreover, since a plurality of thermoelectric modules are required, the manufacturing cost is high, and since a plurality of bulky thermoelectric module heat dissipation means must be installed on both sides, it is very disadvantageous for the miniaturization of final products such as water purifiers.

In the cold water-generating apparatus disclosed in Korean Patent Application Laid-Open No. 10-2020-0106673 of Coway Co., Ltd., disclosed is a single thermoelectric module in which a plurality of flow paths having different outer diameters that are formed in a helical shape and arranged to overlap each other are disposed close to the outermost flow path. According to this structure, since three-dimensional helical-shaped flow paths are used and a plurality of flow paths are used, there is an advantage in that the amount of cold water can be increased. However, it is difficult for the cold air of the thermoelectric module to be transmitted to the innermost flow path, and since each flow path is in thermal contact with each other, heat supplied through the relatively high-temperature water obtained is transferred to the other flow path by conduction, and thus, there is a problem in that the cooling efficiency is reduced.

(Patent Document 1) European Patent Publication No. 3674630

(Patent Document 2) Korean Patent Application Laid-Open No. 10-2013-0001910

(Patent Document 3) Korean Registered Patent No. 10-1262719

(Patent Document 4) Korean Patent Application Laid-Open No. 10-2014-0098017

(Patent Document 5) Korean Patent Application Laid-Open No. 10-2020-0106673

DISCLOSURE

Technical Problem

In order to solve the above problems, the apparatus for generating cold water according to the present invention is directed to improving user satisfaction by arranging a block member to surround the outer circumferential surface of the passage member through which a fluid flows, partitioning the inside of the block member, and cooling the block member such that the fluid is cooled, and the temperature at which the fluid is cooled can be sufficiently lowered through the blocked fluid passage, and furthermore, it is provided in the block member, but each cooling passage is disposed in a plurality of zones that are thermally separated from each other, and a connection pipe is provided such that the fluid sequentially flows through the cooling passage, and through this, by preventing heat exchange between the inflowing fluid and the outflowing fluid, the maximum amount of cold water is secured.

The apparatus for generating cold water according to an exemplary embodiment of the present invention is directed to improving manufacturability through structural simplification, because thermally mutually separated zones are formed in a plurality of unit blocks, and the plurality of unit blocks can be simply thermally separated from each other by forming a first separation space such that the plurality of unit blocks are spaced apart from each other.

The apparatus for generating cold water according to an exemplary embodiment of the present invention is directed to improving user satisfaction through reducing the manufacturing costs and miniaturization of an apparatus, because the thermoelectric module is arranged to overlap the first to n-th cooling passages, and thus, it is possible to cool a plurality of cooling passages by using a single thermoelectric module.

The apparatus for generating cold water according to an exemplary embodiment of the present invention is directed to improving user satisfaction, because while the cooling member is disposed on one side of the block member in a depth direction, the fluid introduced to the other side in the depth direction through the inlet is cooled while flowing along the cooling passage in a direction toward one side in the depth direction (direction closer to the cooling member), and it is continuously cooled while moving to the other cooling passage through a connection pipe that is disposed on one side in the depth direction, and the cooled fluid flows along a direction toward the other side in the depth direction (direction away from the cooling member) and is discharged through an outlet that is disposed on the other side in the depth direction, and thus, the maximum amount of cold water is secured by preventing heat exchange between the inflowing fluid and the outflowing fluid.

The apparatus for generating cold water according to an exemplary embodiment of the present invention is directed to improving user satisfaction, because while the cooling member is disposed on one side of the block member in a depth direction, the fluid introduced to the other side in the depth direction through the inlet is cooled while flowing along the cooling passage in a direction toward one side in the depth direction (direction closer to the cooling member), and it is continuously cooled while moving to the other cooling passage through a connection pipe that is disposed on one side in the depth direction, and since the cooled fluid flows along the cooling passage in a direction toward one side in the depth direction (direction closer to the cooling member) and is discharged through an outlet that is disposed on one side in the depth direction, and thus, the maximum amount of cold water is secured by preventing heat exchange between the inflowing fluid and the outflowing fluid.

The apparatus for generating cold water according to an exemplary embodiment of the present invention is directed to reducing the manufacturing cost and improving manufacturability through structural simplification, because a plurality of unit blocks are thermally interconnected by a connection rib, and thus, it is possible to simultaneously cool a plurality of unit blocks by using a cooling member.

The apparatus for generating cold water according to an exemplary embodiment of the present invention is directed to reducing the manufacturing cost and improving manufacturability through structural simplification, because a plurality of unit blocks are thermally interconnected by a connection rib, and thus, it is possible to simultaneously cool the plurality of unit blocks by using fewer cooling members than the unit blocks.

The apparatus for generating cold water according to an exemplary embodiment of the present invention is directed to improving user satisfaction, because the cooling passage is three-dimensionalized as it is wound while including a straight passage and a curved passage, and thus, the length of the entire passage through which the fluid flows through the block-shaped fluid passage increases such that not only a sufficient amount of cooled fluid can be secured, but also the miniaturization of an apparatus is possible because space efficiency is improved.

The apparatus for generating cold water according to an exemplary embodiment of the present invention is directed to improving user satisfaction through the light weight of an apparatus, because straight and curved blocks are provided to effectively cool the straight and curved passages, and a second separation space is formed to effectively prevent heat exchange between the cooled fluid and the inflowing fluid as the straight and curved blocks are spaced apart from each other, and thus, as the second separation space is formed, the weight of the block member is reduced.

The apparatus for generating cold water according to an exemplary embodiment of the present invention is directed to improving user satisfaction, because as the cooling passages are stacked and arranged in a helical shape and three-dimensionalized, the length of the entire passage is increased through the block-shaped fluid passage such that not only a sufficient amount of cooled fluid can be secured, but also the miniaturization of an apparatus is possible because space efficiency is improved.

The apparatus for generating cold water according to an exemplary embodiment of the present invention is directed to improving user satisfaction, because by forming the range of a width direction length of the block member to correspond to the size of the thermoelectric module, it is possible to secure sufficient cooling performance, and at the same time, the apparatus is miniaturized.

The apparatus for generating cold water according to an exemplary embodiment of the present invention is directed to improving user satisfaction, because by forming the range of a height direction length of the block member to correspond to the size of the thermoelectric module, it is possible to secure sufficient cooling performance, and at the same time, the apparatus is miniaturized.

The apparatus for generating cold water according to an exemplary embodiment of the present invention is directed to improving user satisfaction, because by forming the range of a depth direction length of the block member to correspond to the size of the thermoelectric module, it is possible to secure sufficient cooling performance, and at the same time, the apparatus is miniaturized.

The apparatus for generating cold water according to an exemplary embodiment of the present invention is directed to the deterioration of cooing performance of the block member by providing a case member that is made of an insulating material surrounding the outer circumferential surface of the block member.

The apparatus for generating cold water according to an exemplary embodiment of the present invention is directed to improving user satisfaction, because by placing a separate insulation wall between unit blocks, heat exchange between unit blocks is prevented more effectively, and the maximum amount of cold water is secured.

The water purifier according to the present invention is directed to improving user satisfaction, because the water purifier generates purified water by filtering raw water, and supplies the generated purified water to generate cold water, and the cold water generating unit arranges a block member to cover the outer circumferential surface of the passage member through which a fluid flows, and cools the block member to cool the fluid, and thus, it is possible not only to sufficiently lower the temperature at which the fluid is cooled, but also to respectively arrange cooling passages in a plurality of zones that are provided in the block member and are thermally separated from each other, and connecting pipes are provided such that the fluid flows sequentially through these cooling passages, and through this, the maximum amount of cold water is secured by preventing heat exchange between the inflowing fluid and the outflowing fluid.

Technical Solution

In order to achieve the above objects, the apparatus for generating cold water according to the present invention may include a flow path member through which a fluid flows; a block member which surrounds the outer circumferential surface of the flow path member to thermally contact the flow path member; and a cooling member which is provided with a thermoelectric module that is disposed on one side of the block member to cool the block member, wherein the block member includes a plurality of zones that are thermally separated from each other, and wherein the flow path member includes first to n-th cooling passages (n is an integer of 2 or more) that are respectively disposed in the plurality of zones, an inlet which is formed at one end of each of the cooling passages and exposed to the outside of the block member, an outlet which is formed at the other end of each of the cooling passages and exposed to the outside of the block member, and a connection pipe which connects the outlet of the k-th cooling passage (k is an integer of 1 or more and less than or equal to n−1) and the inlet of the k+1th cooling passage.

In the apparatus for generating cold water according to the present invention, the block member may include a plurality of unit blocks in which the zones are respectively formed and a first separation space in which each unit block is disposed to be spaced apart from each other by a predetermined distance.

In the apparatus for generating cold water according to the present invention, in the cooling member, the thermoelectric module may be disposed to overlap the first to n-th cooling passages.

In the apparatus for generating cold water according to the present invention, the thermoelectric module may be disposed on one side of the block member in a depth direction, wherein the inlet of the k-th cooling passage is disposed far from the thermoelectric module, and the outlet of the k-th cooling passage is disposed close to the thermoelectric module, and wherein the inlet of the k+1th cooling passage is disposed close to the thermoelectric module, and the outlet of the k+1th cooling passage is disposed far from the thermoelectric module.

In the apparatus for generating cold water according to the present invention, the thermoelectric module may be disposed on one side of the block member in a depth direction, wherein the inlet of the k-th cooling passage is disposed far from the thermoelectric module, and the outlet of the k-th cooling passage is disposed close to the thermoelectric module, and wherein the inlet of the k+1th cooling passage is disposed far from the thermoelectric module, and the outlet of the k+1th cooling passage is disposed close to the thermoelectric module.

In the apparatus for generating cold water according to the present invention, the first separation space may be disposed far from the thermoelectric module.

In the apparatus for generating cold water according to the present invention, the block member may include a connection rib that thermally interconnects one side of the unit block in a depth direction such that the cooling member simultaneously cools the plurality of unit blocks.

In the apparatus for generating cold water according to the present invention, the cooling member may include at least one thermoelectric module, and wherein the number of thermoelectric modules is less than the number of unit blocks.

In the apparatus for generating cold water according to the present invention, the cooling passage may include a straight passage through which the fluid flows in a straight direction and a curved passage through which the fluid flows in a curved direction, and the cooling passage is wound at least once such that the fluid sequentially flows through the straight passage and the curved passage.

In the apparatus for generating cold water according to the present invention, the block member may include a straight block surrounding the outer circumferential surface of the straight passage, a curved block surrounding the outer circumferential surface of the curved passage, and a second separation space that spaces apart the straight block and the curved block that are disposed to face each other.

In the apparatus for generating cold water according to the present invention, the cooling passages may be stacked in a helical shape.

In the apparatus for generating cold water according to the present invention, the thermoelectric module may be provided with a rectangular periphery having a width direction length (A) 301 and a height direction length (B) 303, and wherein when the thermoelectric length (C) of the thermoelectric module is defined by the mathematical formula of $C=\sqrt{(AB)}$, the width direction length (AA) of the block member satisfies the range of $1.5\ C<AA<4\ C$.

In the apparatus for generating cold water according to the present invention, the thermoelectric module may be provided with a rectangular periphery having a width direction length (A) 301 and a height direction length (B) 303, and wherein when the thermoelectric length (C) of the thermoelectric module is defined by the mathematical formula of $C=\sqrt{(AB)}$, the height direction length (BB) of the block member satisfies the range of $2.3\ C<BB<5.5\ C$.

In the apparatus for generating cold water according to the present invention, the thermoelectric module may be provided with a rectangular periphery having a width direction length (A) 301 and a height direction length (B) 303, and wherein when the thermoelectric length (C) of the thermoelectric module is defined by the mathematical formula of $C=\sqrt{(AB)}$, the depth direction length (DD) of the block member satisfies the range of $C<DD<3.7\ C$.

The apparatus for generating cold water according to the present invention may further include a case member which is made of an insulating material surrounding the outer circumferential surface of the block member.

In the apparatus for generating cold water according to the present invention, the case member may include a heat insulating wall that is inserted and disposed into the first separation space.

The water purifier according to the present invention may include a filtering unit for filtering raw water to generate purified water; and a cold water generating unit for generating cold water by receiving purified water from the filtering unit, wherein the cold water generating unit includes a flow path member through which a fluid flows, a block member which surrounds the outer circumferential surface of the flow path member to thermally contact the flow path member, and a cooling member which is provided with a thermoelectric module that is disposed on one side of the block member to cool the block member, wherein the block member includes a plurality of zones that are thermally separated from each other, and wherein the flow path member includes first to n-th cooling passages (n is an integer of 2 or more) that are respectively disposed in the plurality of zones, an inlet which is formed at one end of each of the cooling passages and exposed to the outside of the block member, an outlet which is formed at the other end of each of the cooling passages and exposed to the outside of the block member, and a connection pipe which connects the outlet of the k-th cooling passage (k is an integer of 1 or more and less than or equal to n−1) and the inlet of the k+1th cooling passage.

Advantageous Effects

According to the above configurations, the apparatus for generating cold water according to the present invention provides the effect of improving user satisfaction by arranging a block member to surround the outer circumferential surface of the passage member through which a fluid flows, partitioning the inside of the block member, and cooling the block member such that the fluid is cooled, and the temperature at which the fluid is cooled can be sufficiently lowered through the blocked fluid passage, and furthermore, it is provided in the block member, but each cooling passage is disposed in a plurality of zones that are thermally separated from each other, and a connection pipe is provided such that the fluid sequentially flows through the cooling passage, and through this, by preventing heat exchange between the inflowing fluid and the outflowing fluid, the maximum amount of cold water is secured.

The apparatus for generating cold water according to an exemplary embodiment of the present invention provides the effect of improving manufacturability through structural simplification, because thermally mutually separated zones are formed in a plurality of unit blocks, and the plurality of unit blocks can be simply thermally separated from each other by forming a first separation space such that the plurality of unit blocks are spaced apart from each other.

The apparatus for generating cold water according to an exemplary embodiment of the present invention provides the effect of improving user satisfaction through reducing the manufacturing costs and miniaturization of an apparatus, because the thermoelectric module is arranged to overlap the first to n-th cooling passages, and thus, it is possible to cool a plurality of cooling passages by using a single thermoelectric module.

The apparatus for generating cold water according to an exemplary embodiment of the present invention provides the effect of improving user satisfaction, because while the cooling member is disposed on one side of the block member in a depth direction, the fluid introduced to the other side in the depth direction through the inlet is cooled while flowing along the cooling passage in a direction toward one side in the depth direction (direction closer to the cooling member), and it is continuously cooled while moving to the other cooling passage through a connection pipe that is disposed on one side in the depth direction, and the cooled fluid flows along a direction toward the other side in the depth direction (direction away from the cooling member) and is discharged through an outlet that is disposed on the other side in the depth direction, and thus, the maximum amount of cold water is secured by preventing heat exchange between the inflowing fluid and the outflowing fluid.

The apparatus for generating cold water according to an exemplary embodiment of the present invention provides the effect of improving user satisfaction, because while the cooling member is disposed on one side of the block member in a depth direction, the fluid introduced to the other side in the depth direction through the inlet is cooled while flowing along the cooling passage in a direction toward one side in the depth direction (direction closer to the cooling member), and it is continuously cooled while moving to the other cooling passage through a connection pipe that is disposed on one side in the depth direction, and since the cooled fluid flows along the cooling passage in a direction toward one side in the depth direction (direction closer to the cooling member) and is discharged through an outlet that is disposed on one side in the depth direction, and thus, the maximum amount of cold water is secured by preventing heat exchange between the inflowing fluid and the outflowing fluid.

The apparatus for generating cold water according to an exemplary embodiment of the present invention provides the effects of reducing the manufacturing cost and improving manufacturability through structural simplification, because a plurality of unit blocks are thermally interconnected by a connection rib, and thus, it is possible to simultaneously cool a plurality of unit blocks by using a cooling member.

The apparatus for generating cold water according to an exemplary embodiment of the present invention provides the effects of reducing the manufacturing cost and improving manufacturability through structural simplification, because a plurality of unit blocks are thermally interconnected by a connection rib, and thus, it is possible to simultaneously cool the plurality of unit blocks by using fewer cooling members than the unit blocks.

The apparatus for generating cold water according to an exemplary embodiment of the present invention provides the effect of improving user satisfaction, because the cooling passage is three-dimensionalized as it is wound while including a straight passage and a curved passage, and thus, the length of the entire passage through which the fluid flows through the block-shaped fluid passage increases such that not only a sufficient amount of cooled fluid can be secured, but also the miniaturization of an apparatus is possible because space efficiency is improved.

The apparatus for generating cold water according to an exemplary embodiment of the present invention provides the effect of improving user satisfaction through the light weight of an apparatus, because straight and curved blocks are provided to effectively cool the straight and curved passages, and a second separation space is formed to effectively prevent heat exchange between the cooled fluid and the inflowing fluid as the straight and curved blocks are spaced apart from each other, and thus, as the second separation space is formed, the weight of the block member is reduced.

The apparatus for generating cold water according to an exemplary embodiment of the present invention provides the effect of improving user satisfaction, because as the cooling passages are stacked and arranged in a helical shape and three-dimensionalized, the length of the entire passage is increased through the block-shaped fluid passage such that not only a sufficient amount of cooled fluid can be secured, but also the miniaturization of an apparatus is possible because space efficiency is improved.

The apparatus for generating cold water according to an exemplary embodiment of the present invention provides the effect of improving user satisfaction, because by forming the range of a width direction length of the block member to correspond to the size of the thermoelectric module, it is possible to secure sufficient cooling performance, and at the same time, the apparatus is miniaturized.

The apparatus for generating cold water according to an exemplary embodiment of the present invention provides the effect of improving user satisfaction, because by forming the range of a height direction length of the block member to correspond to the size of the thermoelectric module, it is possible to secure sufficient cooling performance, and at the same time, the apparatus is miniaturized.

The apparatus for generating cold water according to an exemplary embodiment of the present invention provides the effect of improving user satisfaction, because by forming the range of a depth direction length of the block member to correspond to the size of the thermoelectric module, it is possible to secure sufficient cooling performance, and at the same time, the apparatus is miniaturized.

The apparatus for generating cold water according to an exemplary embodiment of the present invention provides the effect of the deterioration of cooing performance of the block member by providing a case member that is made of an insulating material surrounding the outer circumferential surface of the block member.

The apparatus for generating cold water according to an exemplary embodiment of the present invention provides the effect of improving user satisfaction, because by placing a separate insulation wall between unit blocks, heat exchange between unit blocks is prevented more effectively, and the maximum amount of cold water is secured.

The water purifier according to the present invention provides the effect of improving user satisfaction, because the water purifier generates purified water by filtering raw water, and supplies the generated purified water to generate cold water, and the cold water generating unit arranges a block member to cover the outer circumferential surface of the passage member through which a fluid flows, and cools the block member to cool the fluid, and thus, it is possible not only to sufficiently lower the temperature at which the fluid is cooled, but also to respectively arrange cooling passages in a plurality of zones that are provided in the block member and are thermally separated from each other, and connecting pipes are provided such that the fluid flows sequentially through these cooling passages, and through this, the maximum amount of cold water is secured by preventing heat exchange between the inflowing fluid and the outflowing fluid.

MODES OF THE INVENTION

Figure 1:
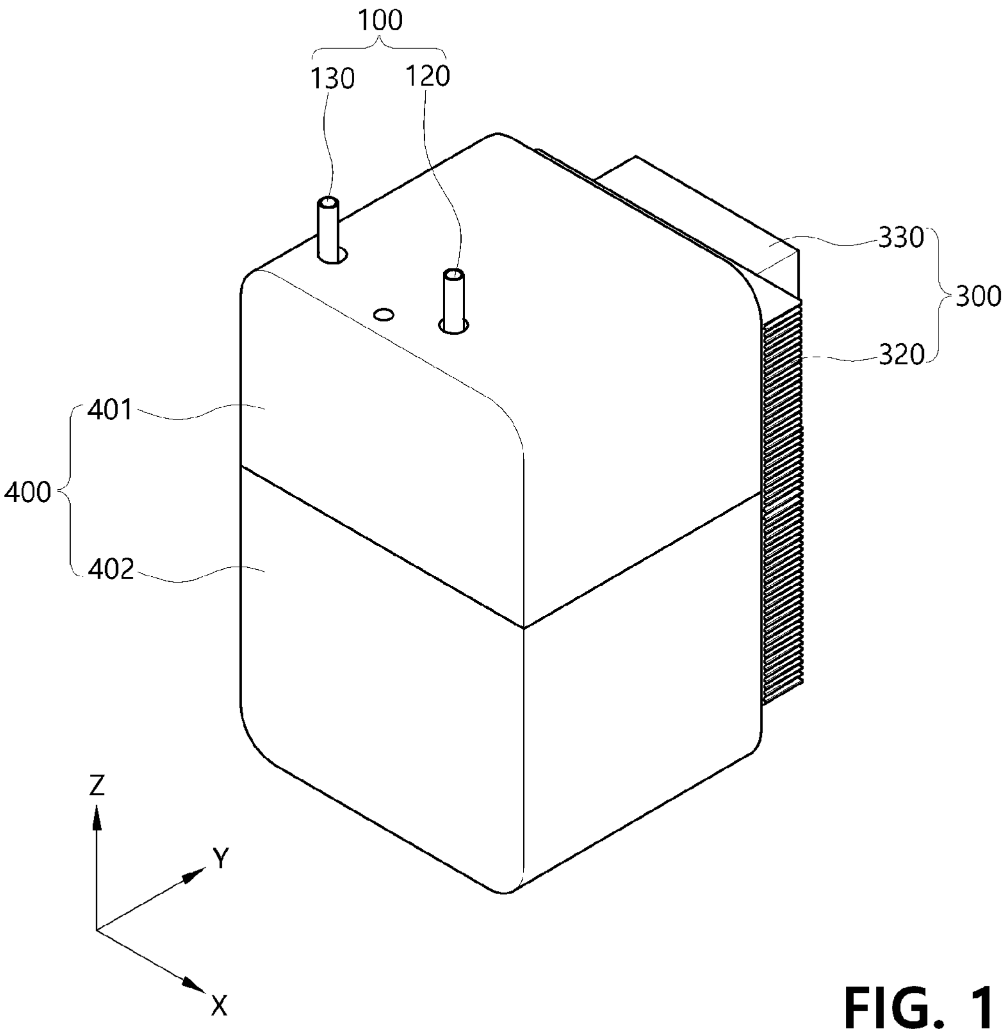
FIGS. 1 and 2 are perspective views illustrating the cold-water generating apparatus according to an exemplary embodiment of the present invention as viewed from different directions.

Terms and words used in the present specification and claims should not be construed as limited to their usual or dictionary definition, and they should be interpreted as a meaning and concept consistent with the technical idea of the present invention based on the principle that inventors may appropriately define the terms and concept in order to describe their own invention in the best way Accordingly, the exemplary embodiments described in the present specification and the configurations shown in the drawings correspond to preferred exemplary embodiments of the present invention, and do not represent all the technical spirit of the present invention, and thus, the configurations may have various examples of equivalent and modification that can replace them at the time of filing the present invention.

It is understood that the terms “include” or “have”, when used in the present specification, are intended to describe the presence of stated features, integers, steps, operations, elements, components and/or a combination thereof but not preclude the possibility of the presence or addition of one or more other features, integers, steps, operations, elements, components or a combination thereof.

The presence of an element in/on “front”, “rear”, “upper or above or top” or “lower or below or bottom” of another element includes not only being disposed in/on “front”, “rear”, “upper or above or top” or “lower or below or bottom” directly in contact with other elements, but also cases in which another element being disposed in the middle, unless otherwise specified. In addition, unless otherwise specified, that an element is “connected” to another element includes not only direct connection to each other but also indirect connection to each other.

Hereinafter, the apparatus for generating cold water according to the present invention will be described with reference to the drawings.

Figure 2:
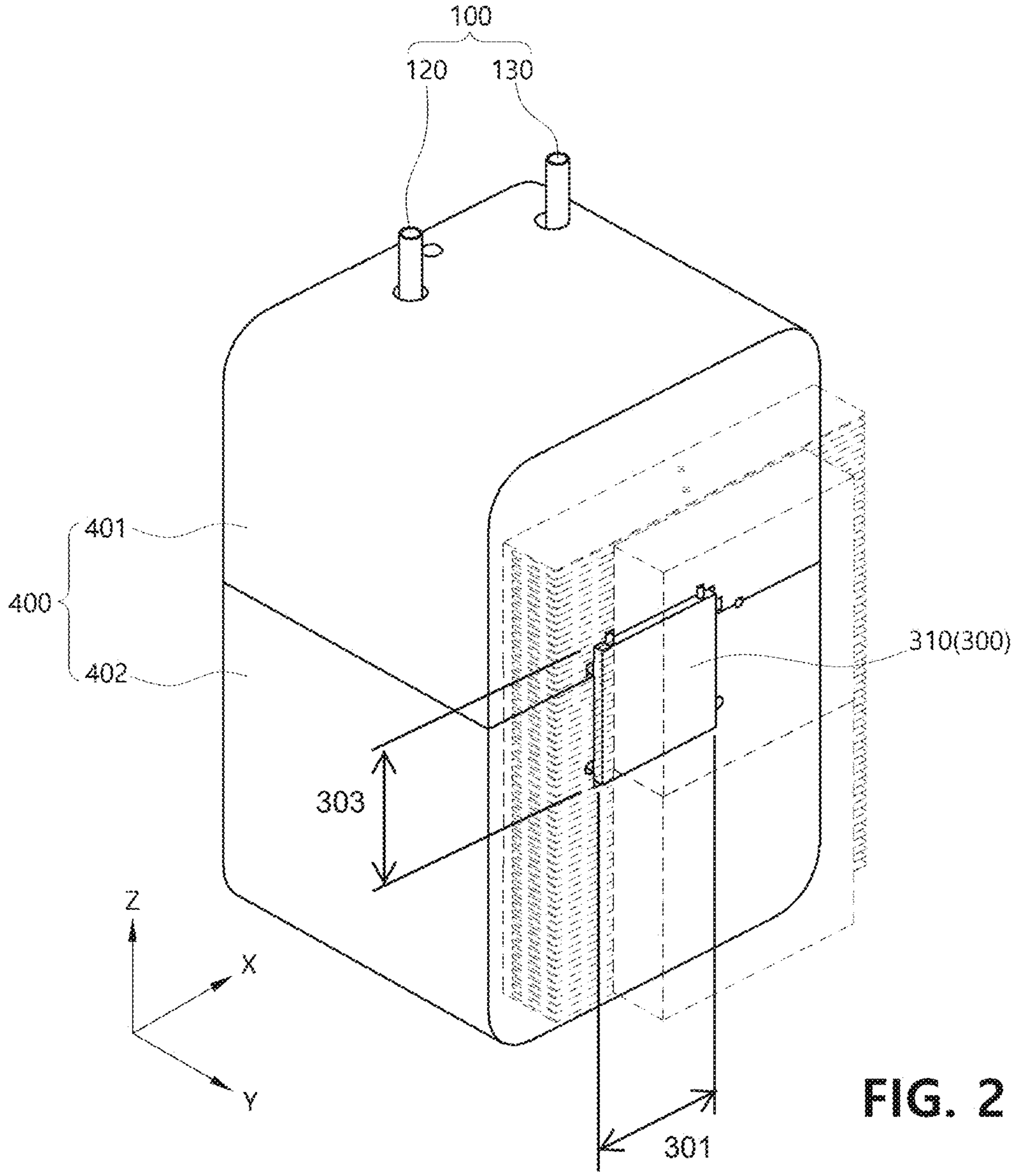
Figure 3:
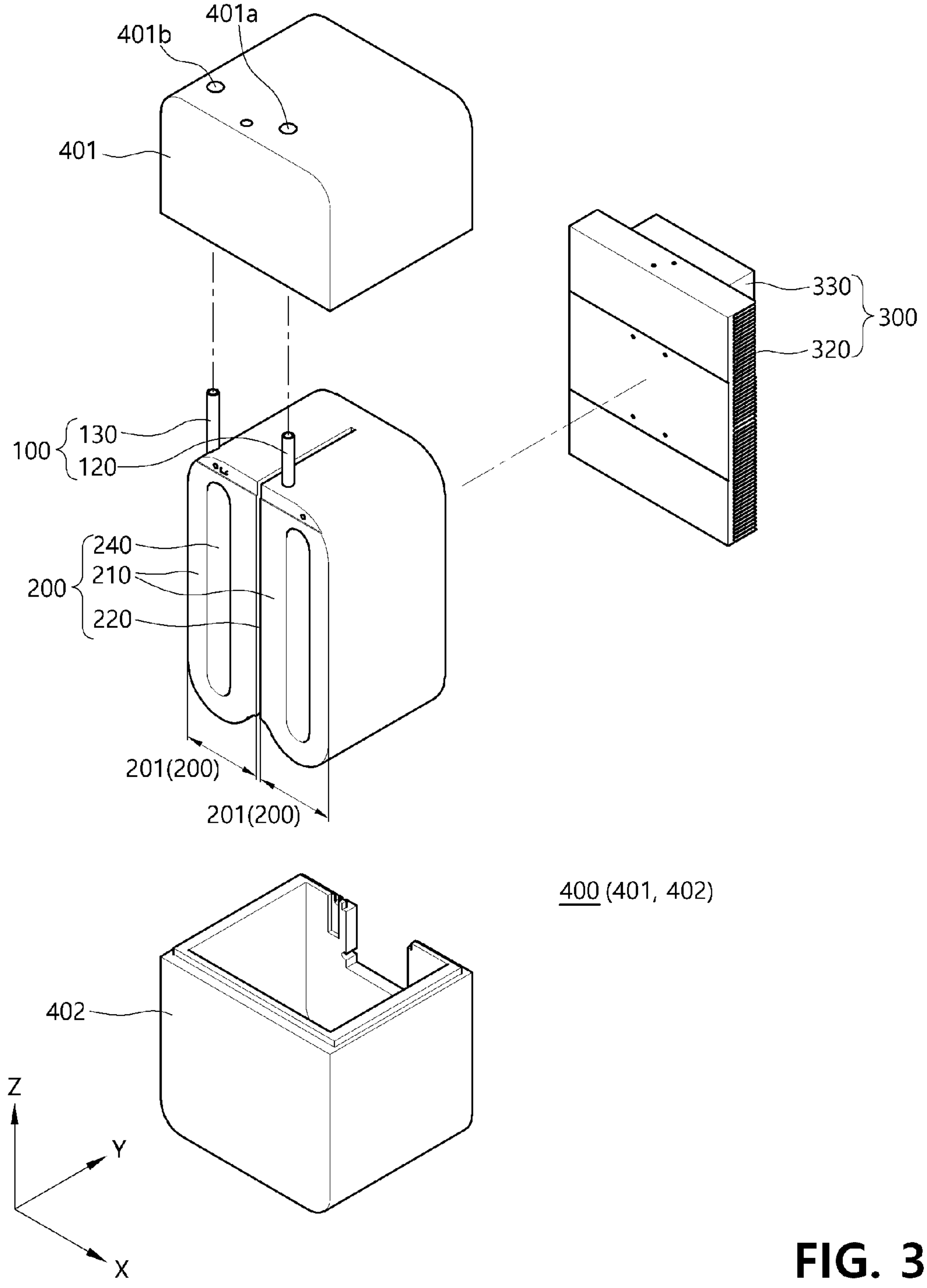
FIG. 3 is an exploded perspective view of the cold-water generating apparatus according to an exemplary embodiment of the present invention.
Figure 4:
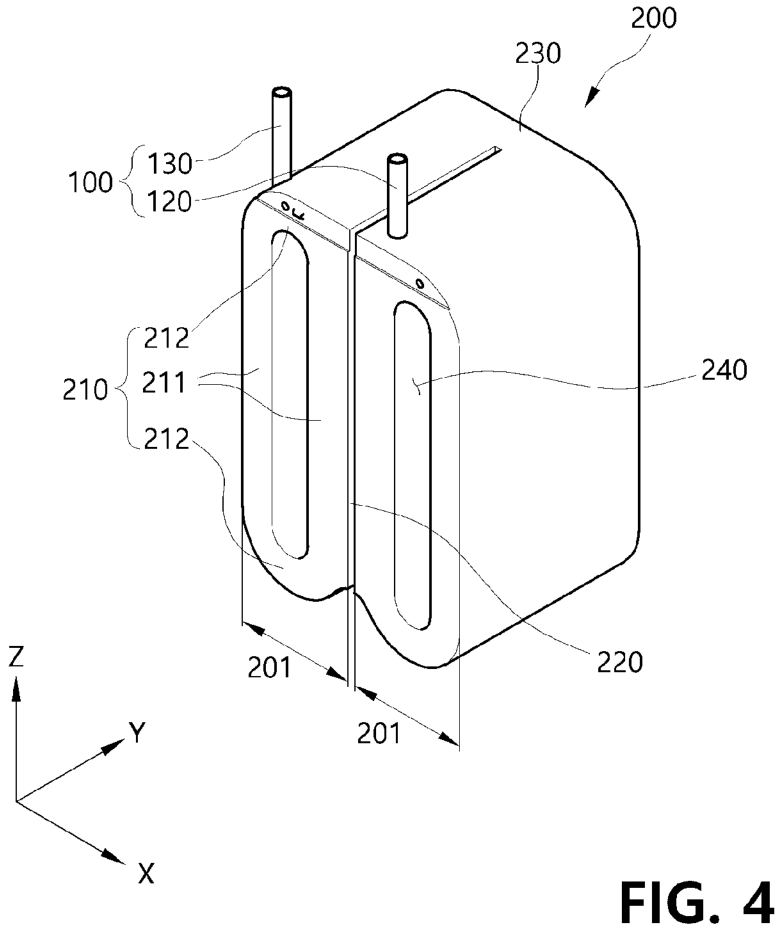
FIG. 4 is a perspective view showing a block member according to an exemplary embodiment of the present invention.
Figure 5:
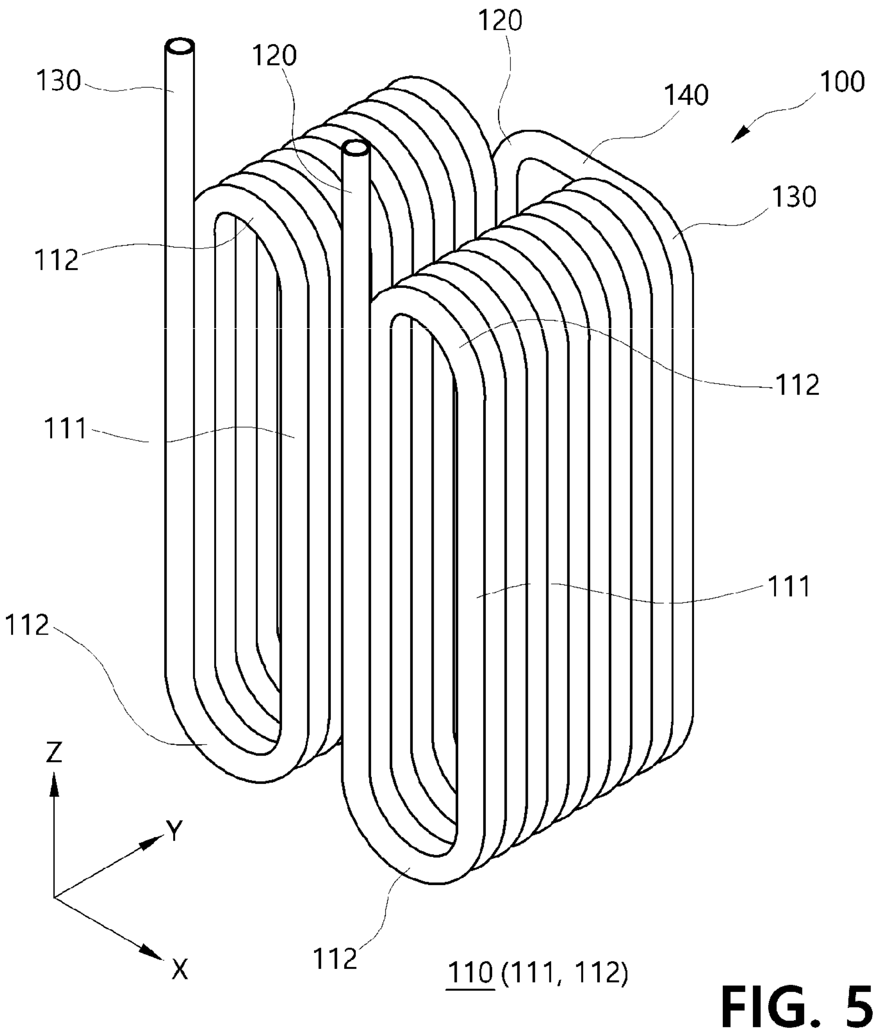
FIG. 5 is a perspective view illustrating a flow path member according to an exemplary embodiment of the present invention.
Figure 6:
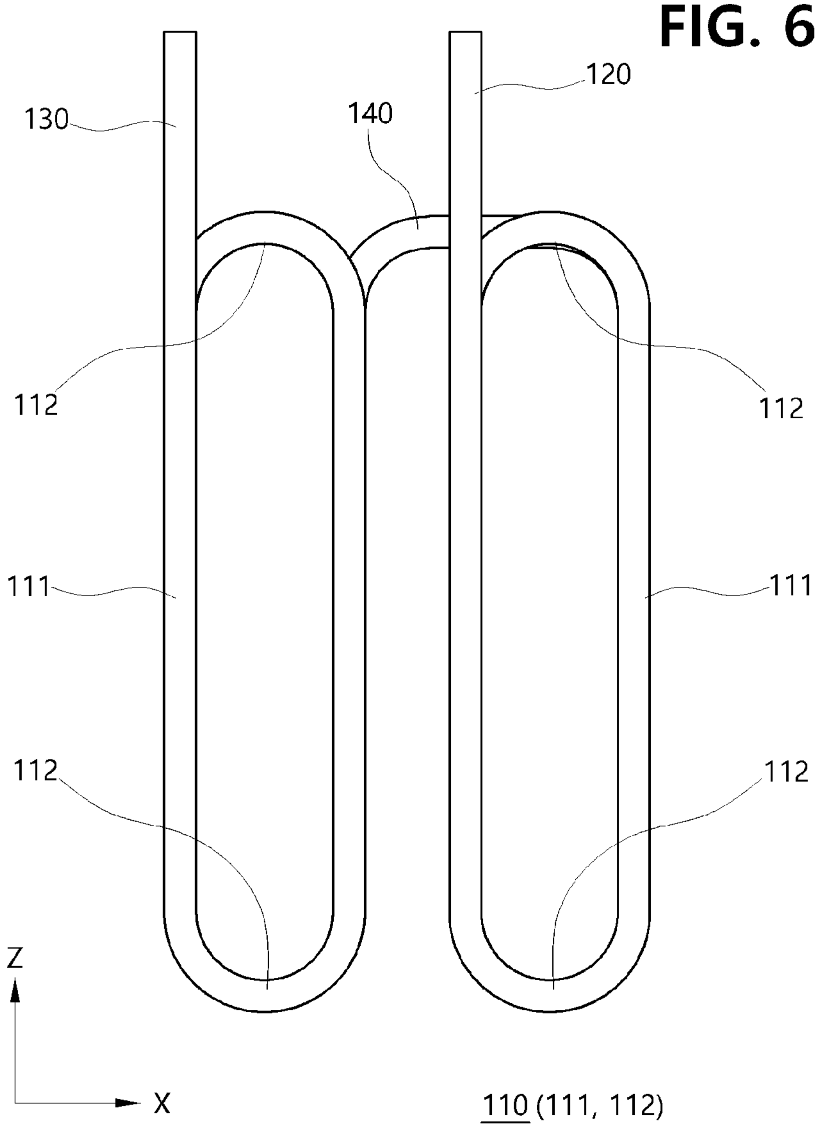
FIG. 6 is a front view showing a flow path member according to an exemplary embodiment of the present invention.

FIGS. 1 and 2 are perspective views illustrating the cold-water generating apparatus according to an exemplary embodiment of the present invention as viewed from different directions, FIG. 3 is an exploded perspective view of the cold-water generating apparatus according to an exemplary embodiment of the present invention, FIG. 4 is a perspective view showing a block member according to an exemplary embodiment of the present invention, FIG. 5 is a perspective view illustrating a flow path member according to an exemplary embodiment of the present invention, and FIG. 6 is a front view showing a flow path member according to an exemplary embodiment of the present invention. Herein, the X direction is the width direction of the cold water generating device, the Y direction is the depth direction of the cold water generating device, and the Z direction means the height direction of the cold water generating device. In order to clearly describe the present invention, parts that are not related to the description are omitted from the drawings.

As illustrated in FIGS. 1 to 3, the apparatus for generating cold water according to an exemplary embodiment of the present invention includes a flow path member 100 through which a fluid flows, a block member 200 which surrounds the outer circumferential surface of the flow path member 100 to thermally contact the flow path member 100, and a cooling member 300 which is provided with a thermoelectric module 310 that is disposed on one side of the block member 200 to cool the block member 200. The flow path member 100 provides a space through which a fluid flows. For example, if the flow path member 100 is formed in a tube shape having a circular cross-section with a certain diameter, a direct first-in-first-out structure in which the first introduced fluid flows out first as the fluid flows continuously is possible. The flow path member 100 is not only formed in a circular cross-section, but may be formed in a different cross-sectional shape if the space through which a fluid can flow is formed. The block member 200 is in thermal contact with the flow path member 100, but the block member 200 is disposed to surround the outer circumferential surface of the flow path member 100 to improve cooling performance to partition the inside of the block member 200. As described above, the block member 200 is disposed to surround the outer circumferential surface of the flow path member 100, but the die casting method may be used to manufacture the block member 200 in order to minimize the contact resistance between the block member 200 and the flow path member 100. That is, when the block member 200 is manufactured while the flow path member 100 is disposed in the die casting mold, the contact resistance between the block member 200 and the flow path member 100 is minimized, thereby improving the cooling performance of the fluid. The cooling member 300 may include a thermoelectric module 310 which is disposed on one side of the block member 200 to cool the block member 200. The thermoelectric module 310 is a device that performs cooling or heat generation by using the Peltier Effect, in which heat generation or heat absorption occurs at the connection point of the conducting wires that are made of different materials when a potential value is formed in a closed circuit. As an example, the thermoelectric module 310 manufactured in the form of a thin film may be applied, and when an electrical signal is input, it is configured such that one side absorbs heat, and the other side generates heat. Referring to FIG. 2, one side (thermal contact with the block member) of the thermoelectric module 310 may be a side where heat is absorbed and the temperature falls, and the other side of the thermoelectric module 310 may be a side where heat is generated and the temperature rises. The aforementioned block member 200 is cooled by an endothermic action occurring at one side of the thermoelectric module 310 to cool the flow path member 100. A heat dissipation fin 320 and a heat dissipation fan 330 for dissipating heat may be mounted on the other side of the thermoelectric module 310. This is to perform heat dissipation for the heat dissipation action on the other side when an endothermic action occurs on one side of the thermoelectric module 310. A plurality of these heat dissipation fins 320 may be provided to protrude from the opposite side surface to which the thermoelectric module 310 is coupled, and in this way, when the heat radiation fan 330 operates in a state where the heat radiation fin 320 is provided, the contact area with the outside air is increased, and thus, the heat dissipation effect through convective heat transfer can be increased. As described above, when the block member 200 is cooled by using the thermoelectric module 310, it is possible to minimize noise or vibration generation, and the weight and size of the cooling member 300 may be reduced.

As illustrated in FIG. 4, the block member 200 may include a plurality of zones 201 that are thermally separated from each other. When the plurality of zones 201 that are thermally separated from each other in this way are formed, heat exchange between the inflowing fluid and the outflowing fluid does not occur, thereby preventing the deterioration of cooling performance. In this case, as illustrated in FIGS. 5 and 6, the flow path member 100 may include first to n-th cooling passages 110 (where n is an integer of 2 or more) that are respectively disposed in the plurality of zones 201, an inlet 120 which is formed at one end of each of the cooling passages 110 of the block member 200 and exposed to the outside, an outlet 130 which is formed at the other end of each of the cooling passages 110 and exposed to the outside of the block member 200, and a connection pipe 140 for connecting the outlet 130 of the k-th cooling passage 110 (where k is 1 or more and less than or equal to n−1) and the inlet 120 of the k+1th cooling passage 110. That is, the cooling passage 110 is disposed in each thermally separated zone 201, and the inlet 120 is exposed to the outside of the block member 200 such that the fluid flows into the cooling passage 110, and as the outlet 130 is exposed to the outside of the block member 200 such that the fluid flows out of the cooling passage 110, the fluid flow inside the cooling passage 110 is possible. In this case, the connection pipe 140 is provided to connect the cooling passages 110 that are thermally separated from each other. For example, as illustrated in FIG. 4, when two zones 201 that are thermally separated from each other are provided, as illustrated in FIG. 5, each zone 201 is provided with one cooling passage 110, respectively, such that a total of two cooling passages 110 are provided. In addition, when the cooling passage 110 provided with the inlet 120 is defined as the first cooling passage 110 and the cooling passage 110 provided with the outlet 130 is defined as the second cooling passage 110, an inlet 120 through which a fluid flows into the first cooling passage 110 and an outlet 130 through which a fluid flows out of the first cooling passage 110 may be formed, and an inlet 120 through which a fluid flows into the second cooling passage 110 and an outlet through which a fluid flows out of the second cooling passage 110 may be formed. The inlet 120 and outlet 130 refer to parts through which the fluid flows in or out, and they refer to not only the inlet 120 and the outlet 130 in the form of a hole that is respectively formed at both ends of the cooling passage 110 that is integrally formed, but also collectively refer to all parts of the pipe-shaped flow path through which a fluid flows in or out. Moreover, since the outlet 130 of the first cooling passage 110 and the inlet 120 of the second cooling passage 110 may communicate with each other by the connection pipe 140, the fluid that is cooled while flowing through the first cooling passage 110 moves to the second cooling passage 110 through the connection pipe 140 and is continuously cooled while flowing through the second cooling passage 110. That is, as described above, the block member 200 is disposed to surround the outer circumferential surface of the flow path member 100 through which the fluid flows to partition the inside of the block member 200, and the block member 200 is cooled to allow the fluid to flow such that the temperature at which the fluid is cooled through the block-shaped fluid flow path can be sufficiently lowered, and the cooling passages 110 are disposed in each of the plurality of zones 201 that are provided in the block member 200 and are thermally separated from each other, and a connection pipe 140 is provided such that the fluid sequentially flows through these cooling passages 110. is provided, and through this, it is possible to improve user satisfaction by securing the maximum amount of cold water by preventing heat exchange between the inflowing fluid and the outflowing fluid.

Figure 7:
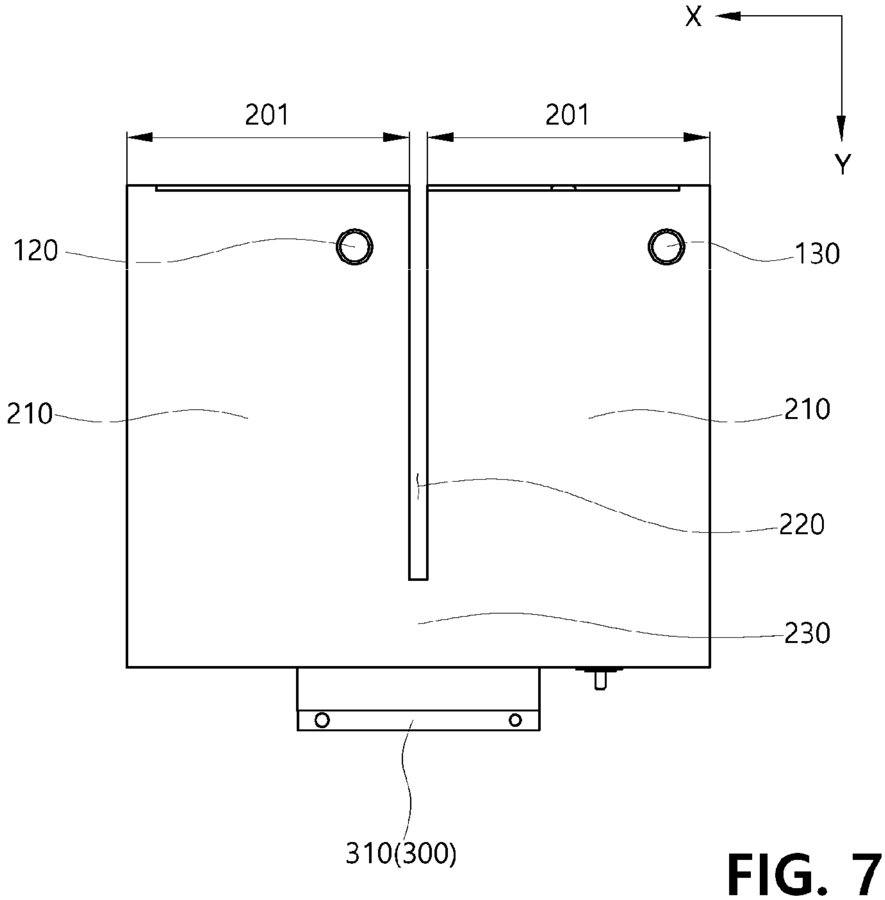
FIG. 7 is a plan view showing a block member according to an exemplary embodiment of the present invention.
Figure 8:
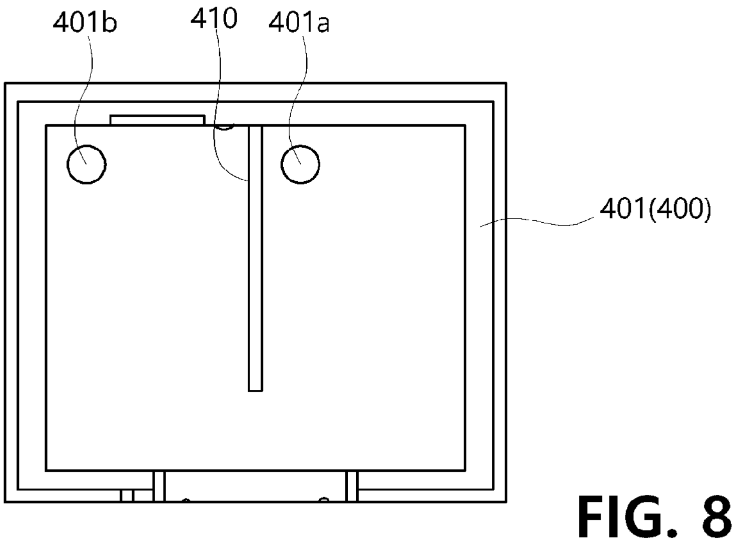
FIG. 8 is a bottom view showing an upper case according to an exemplary embodiment of the present invention.
Figure 9:
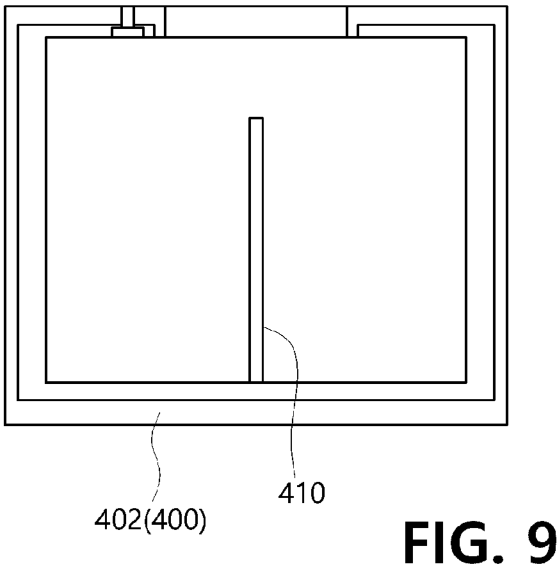
FIG. 9 is a plan view showing a lower case according to an exemplary embodiment of the present invention.

FIG. 7 is a plan view showing a block member according to an exemplary embodiment of the present invention, FIG. 8 is a bottom view showing an upper case according to an exemplary embodiment of the present invention, and FIG. 9 is a plan view showing a lower case according to an exemplary embodiment of the present invention.

As illustrated in FIG. 7, in the apparatus for generating cold water according to an exemplary embodiment of the present invention, the block member 200 may include a plurality of unit blocks 210 in which the zones 201 are respectively formed, and a first separation space 220 for disposing each of the unit blocks 210 to be spaced apart from each other by a predetermined distance. As described above, the block member 200 may be manufactured by the die casting method, and a diaphragm structure for forming the first separation space 220 may be provided in the die casting mold. Alternatively, after the block member 200 is manufactured in a state where the first separation space 220 is not formed, it is also possible to partially cut the block member 200 such that the first separation space 220 is formed. In this way, thermally separated zones 201 are respectively formed in the plurality of unit blocks 210, and by forming the first separation space 220 such that the plurality of unit blocks 210 are spaced apart from each other, the plurality of unit blocks 210 may be simply thermally separated from each other, and it is possible to improve manufacturability through structural simplification. In this case, as illustrated in FIG. 3, a case member 400 made of an insulating material surrounding the outer circumferential surface of the block member 200 may be provided, and the case member 400 may include an upper case 401 for surrounding the upper part of the block member 200 as illustrated in FIG. 8, and a lower case 402 for surrounding the lower part of the block member 200 as illustrated in FIG. 9. An inlet hole 401*a* through which the inlet 120 is disposed to penetrate and an outlet hole 401*b* through which the outlet 130 is disposed to penetrate may be formed in the upper case 401.

In the apparatus for generating cold water according to an exemplary embodiment of the present invention, in the cooling member 300, the thermoelectric module 310 may be disposed to overlap the first to n-th cooling passages 110. Such overlap means that the cooling passages 110 are arranged such that the projection surface of the cooling passages 110 that is formed toward the surface on which the cooling member 300 is disposed overlaps the thermoelectric module 310. In this way, when the thermoelectric module 310 is disposed to overlap the first to n-th cooling passages, a single thermoelectric module 310 or a smaller number of thermoelectric modules 310 than the number of cooling passages 110 are used to cool the plurality of cooling passages 110, and thus, it is possible to reduce the manufacturing cost and improve user satisfaction through the miniaturization of an apparatus.

Figure 10:
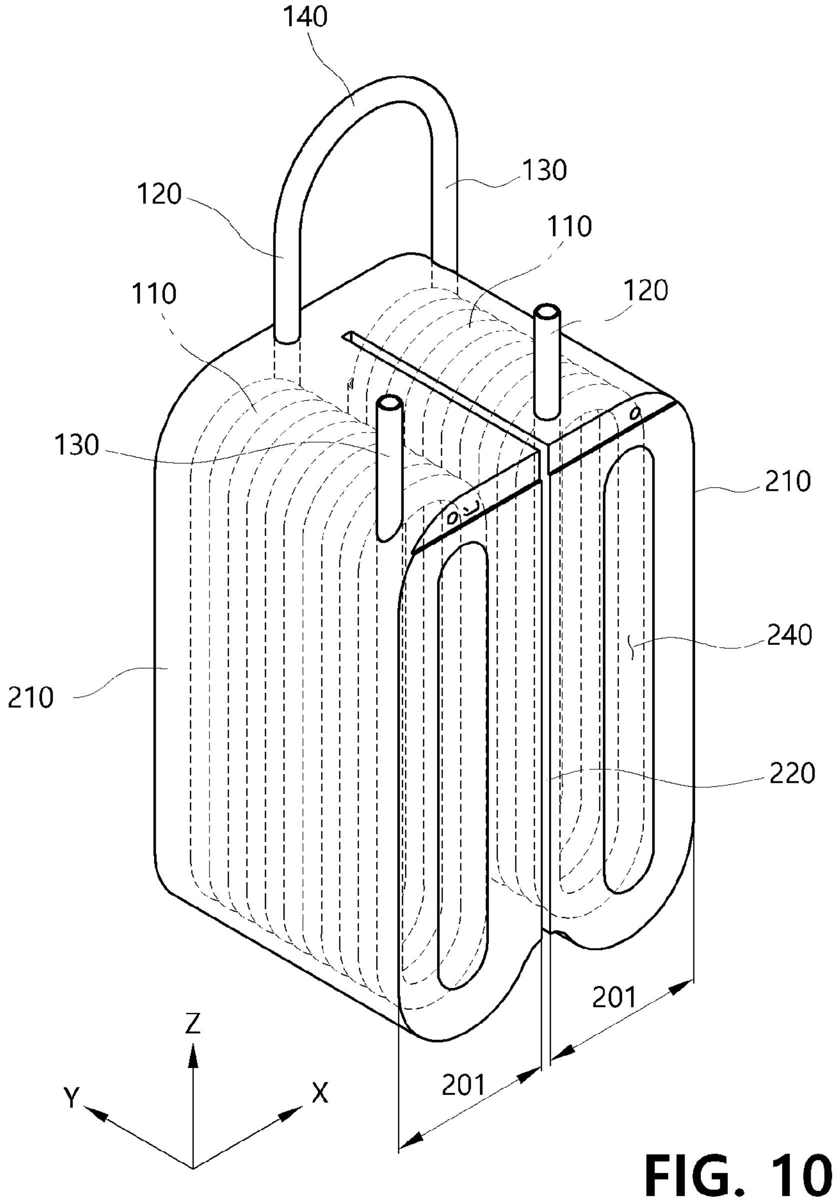
FIG. 10 is a perspective view illustrating a flow path member and a connecting pipe according to an exemplary embodiment of the present invention.

FIG. 10 is a perspective view illustrating a flow path member and a connecting pipe according to an exemplary embodiment of the present invention.

As illustrated in FIG. 10, in the apparatus for generating cold water according to an exemplary embodiment of the present invention, the thermoelectric module 310 may be disposed on one side of the block member 200 in the depth direction Y, the inlet 120 of the k-th cooling passage 110 may be disposed far from the thermoelectric module 310, the inlet 120 of the k+1th cooling passage 110 may be disposed close to the thermoelectric module 310, and the outlet 130 of the k+1th cooling passage 110 may be disposed far from the thermoelectric module 310. For example, when it is assumed that the block member 200 is provided with two cooling passages 110 in a state where the cooling member 300 is disposed on one side of the block member 200 in the depth direction Y, since the inlet 120 of the first cooling passage 110 is disposed far from the thermoelectric module 310 and the outlet 130 of the first cooling passage 110 is disposed close to the thermoelectric module 310, the fluid flowing through the first cooling passage 110 is cooled while moving in a direction closer to the thermoelectric module 310. In this way, the cooled fluid moves to the second cooling passage 110, but since the inlet 120 of the second cooling passage 110 is disposed close to the thermoelectric module 310 and the outlet of the second cooling passage 110 is disposed far from the thermoelectric module, the fluid flowing through the second cooling passage 110 is continuously cooled while moving in a direction away from the thermoelectric module 310. That is, the fluid introduced to the other side in the depth direction Y through the inlet 120 is cooled while flowing along the cooling passage 110 in a direction (direction closer to the cooling member 300)

toward one side in the depth direction Y, and it is continuously cooled while moving to the other cooling passage 110 through the connection pipe 140 that is disposed on one side in the depth direction Y, and since the cooled fluid flows along the cooling passage 110 in a direction toward the other side in the depth direction Y (direction away from the cooling member) and is discharged through the outlet 130 that is disposed on the other side in the depth direction Y, heat exchange between the inflowing fluid and the outflowing fluid does not occur such that it is possible to secure the maximum amount of cold water, and through this, it is possible to improve user satisfaction. In addition, since the outlet 130 of the first cooling channel 110 and the inlet 120 of the second cooling channel 110 are both provided at positions close to the thermoelectric module 310, the length of the connecting pipe 140 connecting the same is formed to be short such that the flow path member 100 may be miniaturized as a whole.

Figure 11:
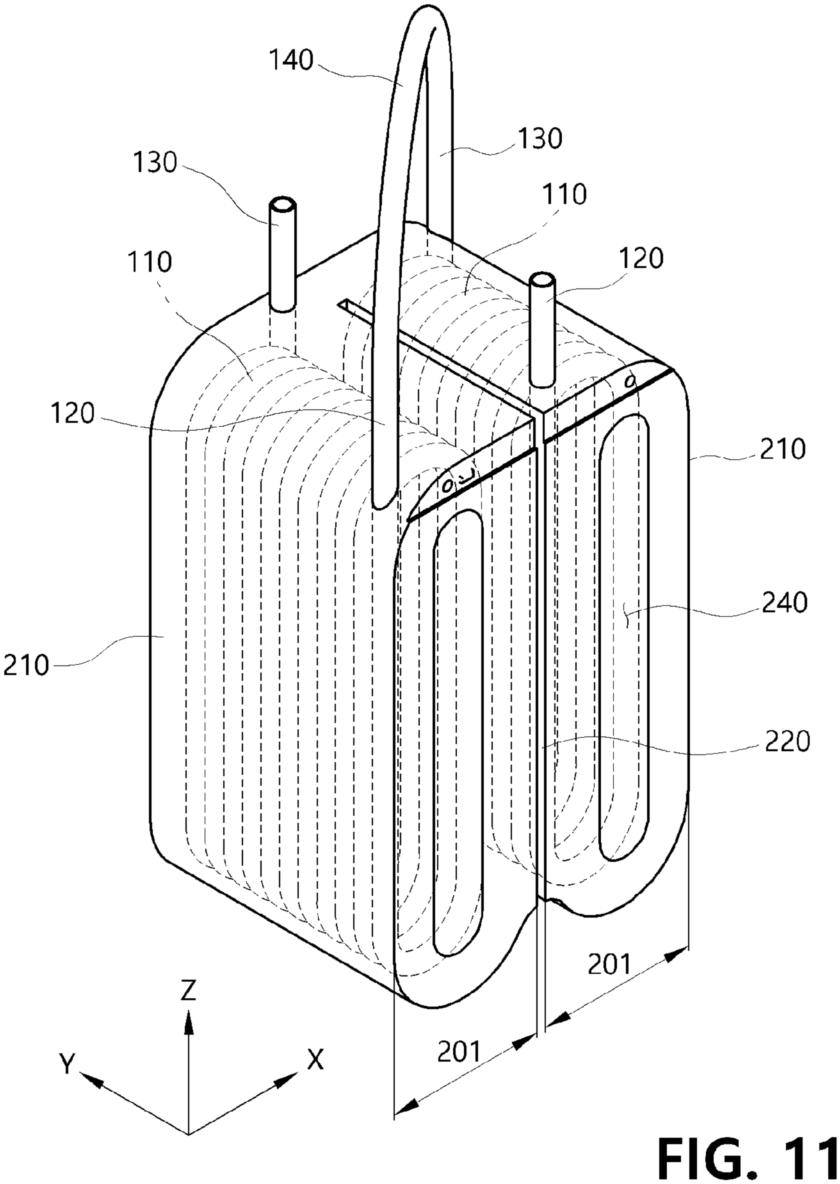
FIG. 11 is a perspective view illustrating a flow path member and a connecting pipe according to another exemplary embodiment of the present invention.

FIG. 11 is a perspective view illustrating a flow path member and a connecting pipe according to another exemplary embodiment of the present invention.

As illustrated in FIG. 11, in the apparatus for generating cold water according to another exemplary embodiment of the present invention, the thermoelectric module 310 may be disposed on one side of the block member 200 in the depth direction Y, the inlet 120 of the k-th cooling passage 110 may be disposed far from the thermoelectric module 310, the outlet 130 of the k-th cooling passage 110 may be disposed close to the thermoelectric module 310, the inlet 120 of the k+1th cooling passage 110 may be disposed far from the thermoelectric module 310, and the outlet 130 of the k+1th cooling passage 110 may be disposed close to the thermoelectric module 310. For example, when the block member 200 is provided with two cooling passages 110 while the cooling member 300 is disposed on one side of the block member 200 in the depth direction Y, since the inlet 120 of the first cooling passage 110 is disposed far from the thermoelectric module 310 and the outlet 130 of the first cooling passage 110 is disposed close to the thermoelectric module 310, the fluid flowing through the first cooling passage 110 is cooled while moving in a direction closer to the thermoelectric module 310. In this way, the cooled fluid moves to the second cooling passage 110, the inlet 120 of the second cooling passage 110 is disposed far from the thermoelectric module 310, and the outlet 130 of the second cooling passage 110 is disposed close to the thermoelectric module 310, and thus, the fluid flowing through the second cooling passage 110 is also continuously cooled while moving in a direction closer to the thermoelectric module 310. That is, while the cooling member 300 is disposed on one side in the depth direction Y of the block member 200, the fluid introduced to the other side in the depth direction Y through the inlet 120 is cooled while flowing along the cooling passage 110 in a direction toward one side in the depth direction Y (direction closer to the cooling member), and it is continuously cooled while moving to the other cooling passage 110 through the connection pipe 140 that is disposed on one side in the depth direction Y, and since the cooled fluid is discharged through the outlet 130 that is disposed on one side in the depth direction Y while flowing along the cooling passage 110 in a direction toward one side in the depth direction Y (direction closer to the cooling member), heat exchange between the inflowing fluid and the outflowing fluid does not occur such that it is possible to secure the maximum amount of cold water, and through this, it is possible to improve user satisfaction. In addition, since the fluid is cooled through the thermoelectric module 310 even in the process of flowing out through the outlet 130 of the second cooling passage 110, it is possible to further improve the cooling performance of fluid.

As illustrated in FIG. 7, in the apparatus for generating cold water according to an exemplary embodiment of the present invention, the first separation space 220 may be disposed far from the thermoelectric module 310. That is, while the thermoelectric module 310 is disposed on one side in the depth direction Y, when the inlet 120 of the first cooling passage 110 and the outlet 130 of the second cooling passage 110 that is disposed adjacent thereto are disposed on the other side in the depth direction Y, respectively, and at the same time, when the first separation space 220 is also disposed on the other side in the depth direction Y, since heat exchange between the inflowing fluid and the outflowing fluid does not occur, it is possible to secure the maximum amount of cold water, and through this, it is possible to improve user satisfaction.

In addition, as illustrated in FIG. 7, in the cold-water generating apparatus according to an exemplary embodiment of the present invention, the block member 200 may include a connection rib 230 for thermally interconnecting one side in the depth direction Y of the unit block 210 such that the cooling member 300 simultaneously cools the plurality of unit blocks 210. For example, the material of the block member 200 is a conductive material, and it may be a metal material such as aluminum or copper, but it may also be a synthetic resin material that is capable of conducting heat as well as such a metal material. As such, when the plurality of unit blocks 210 are thermally interconnected by the connection ribs 230, it is possible to simultaneously cool the plurality of unit blocks 210 by using the cooling member 300, and thus, it is possible to reduce the manufacturing cost and improve manufacturability through structural simplification.

Moreover, as illustrated in FIG. 7, in the apparatus for generating cold water according to an exemplary embodiment of the present invention, the cooling member 300 may include at least one thermoelectric module 310, but the number of thermoelectric modules 310 may be provided to be less than the number of unit blocks 210. For example, a single thermoelectric module 310 is configured to cool two or more unit blocks 210. As such, when the plurality of unit blocks 210 are thermally interconnected by the connection ribs 230, the plurality of unit blocks 210 are simultaneously cooled by using a smaller number of cooling members 300 than the unit blocks 210, and thus, it is possible to reduce the manufacturing cost and improve manufacturability through structural simplification.

As illustrated in FIGS. 5 and 6, in the apparatus for generating cold water according to an exemplary embodiment of the present invention, the cooling passage 110 includes a straight passage 111 through which the fluid flows in a straight direction and a curved passage 112 through which the fluid flows in a curved direction, and the cooling passage 110 may be three-dimensionalized while being wound at least once such that the fluid sequentially flows through the straight passage 111 and the curved passage 112. In this case, it is important that the radius of curvature drawn by the center line of the curved passage 112 is formed to have a minimum radius of curvature in which wrinkles are not formed in the curved passage 112 during a bending process for forming the curved passage 112. This is because, if wrinkles are formed in the curved passage 112, corrosion may occur while fluid is stagnant due to these wrinkles, and deformation problems due to stress concentration may also occur. For example, in the case of the curved passage 112 having an outer diameter of 8 mm, the radius of curvature is preferably about 40 mm. In this way, when the cooling passage 110 is three-dimensionalized while being wound in a state of including the straight passage 111 and the curved passage 112, the length of the entire passage through which the fluid flows through the block-shaped fluid passage is increased such that not only can a sufficient amount of cooled fluid be secured, but also the space efficiency is improved such that the apparatus is miniaturized, and thus, it is possible to improve user satisfaction.

As illustrated in FIG. 4, in the apparatus for generating cold water according to an exemplary embodiment of the present invention, the block member 200 may include a straight block 211 which surrounds the outer circumferential surface of the straight flow path 111, a curved block which surrounds the outer circumferential surface of the curved block 112, and a second separation space 240 for disposing the straight block 211 and the curved block 212 that are disposed to face each other to be spaced apart from each other by a predetermined distance. In this case, the block member 200 is preferably formed to have a sufficient thickness to sufficiently cool the flow path member 100. For example, it is preferable that the thickness of the block member that is respectively disposed on both sides of the flow path member 100 having an outer diameter of 8 mm is 3 mm or more and 7 mm or less. When the thickness is less than 3 mm, the flow path member 100 cannot be sufficiently cooled, and the amount of cooled fluid is reduced. In addition, when the thickness is more than 7 mm, the flow path member 100 can be sufficiently cooled, but there may be other problems in that the weight of the block member 200 is unnecessarily increased. As such, when the straight block 211 and the curved block 212 are provided, the straight passage 111 and the curved passage 112 can be effectively cooled, and the second separation space 240 is formed such that as the straight block 211 and the curved block 212 are disposed to be spaced apart from each other, heat exchange between the cooled fluid and the inflowing fluid can be effectively blocked, and also, as the second separation space 240 is formed, the weight of the block member 200 is reduced, and thus, it is possible to improve user satisfaction through the light weight of an apparatus.

As illustrated in FIG. 5, in the apparatus for generating cold water according to an exemplary embodiment of the present invention, the cooling passages 110 may be stacked in a helical shape. As such, when the cooling passage 110 is stacked and arranged in a helical shape and is three-dimensionalized, the length of the entire passage increases through the block-shaped fluid passage such that it is possible to sufficiently secure the amount of the cooled fluid, and also, the space efficiency is improved such that it is possible to improve user satisfaction because the apparatus is miniaturized.

Figure 12:
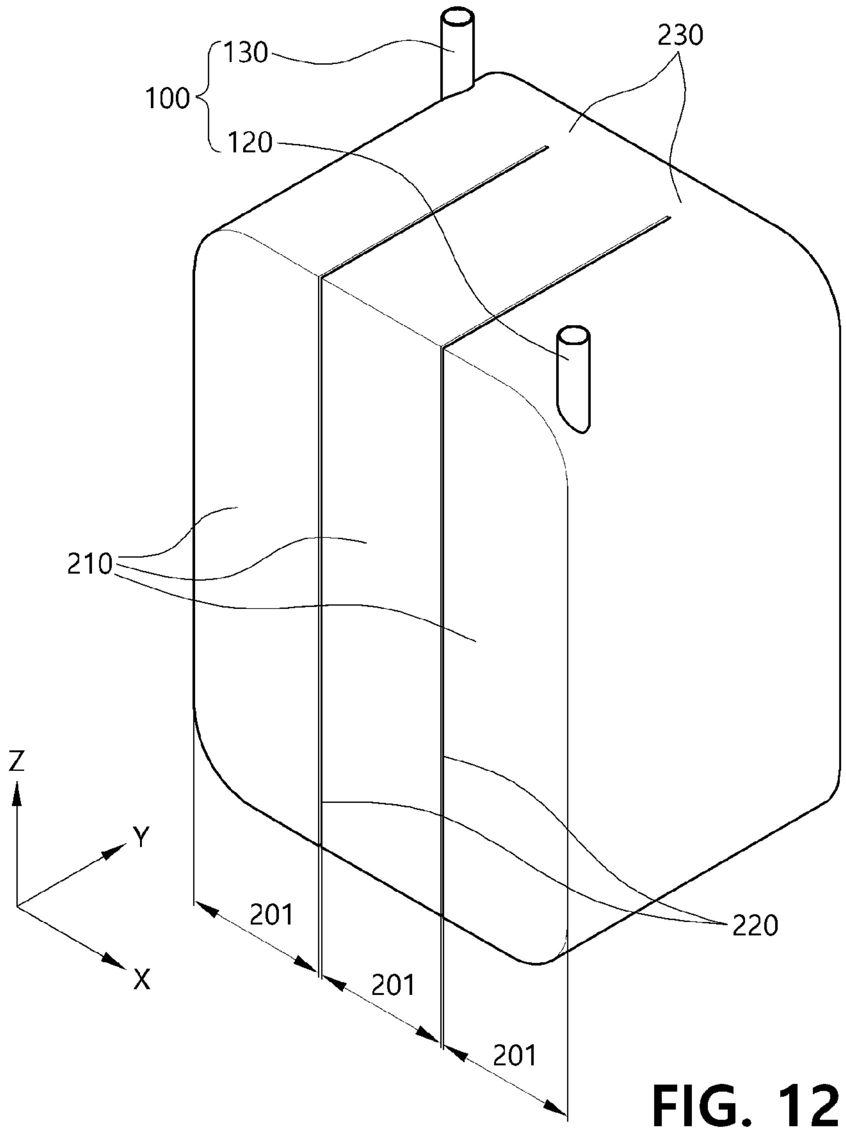
FIG. 12 is a perspective view showing a block member according to another exemplary embodiment of the present invention.
Figure 13:
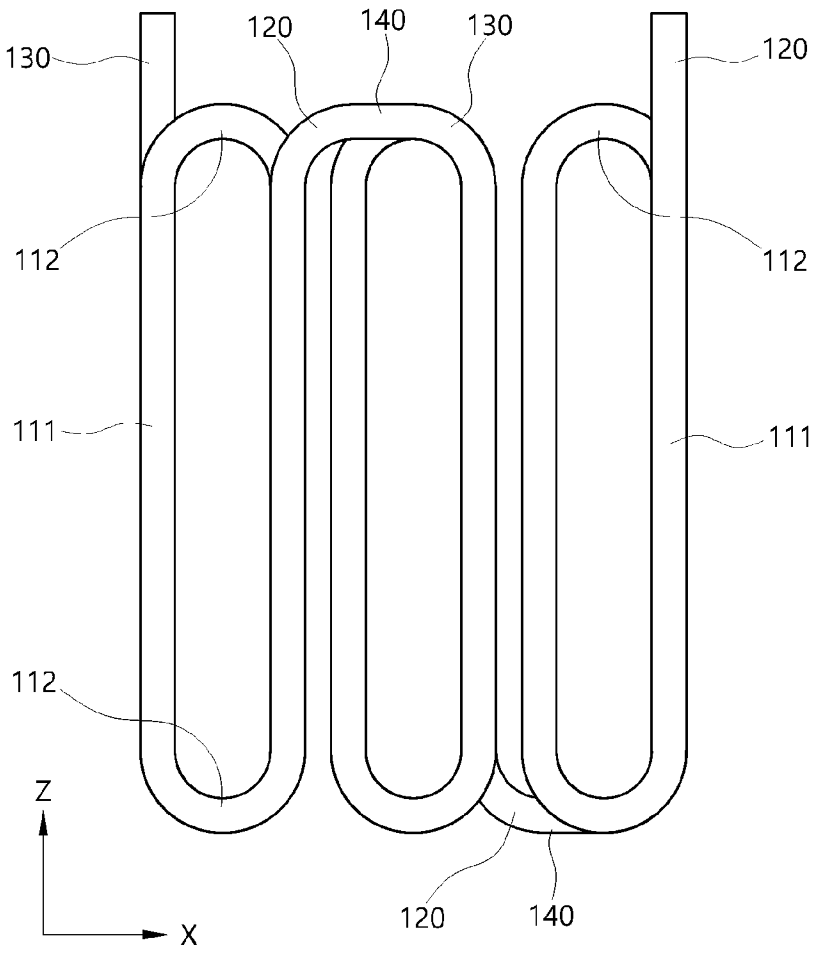
FIG. 13 is a front view showing a flow path member according to another exemplary embodiment of the present invention.

FIG. 12 is a perspective view showing a block member according to another exemplary embodiment of the present invention, and FIG. 13 is a front view showing a flow path member according to another exemplary embodiment of the present invention.

As illustrated in FIG. 12, in the cold-water generating apparatus according to another exemplary embodiment of the present invention, two of the first separation spaces 220 may be formed in the block member 200 such that three zones 201 are formed, and as illustrated in FIG. 13, the cooling passages 110 are respectively disposed in each zone 201. That is, the fluid introduced through the inlet 120 that is disposed on one side in the width direction X is cooled while sequentially passing through the cooling passage 110 and then is discharged to the outside through the outlet 130 that is disposed on the other side in the width direction X. That is, even in this case, the block member 200 is disposed to surround the outer circumferential surface of the flow path member 100 through which the fluid flows, and the temperature at which the fluid is cooled can be sufficiently lowered by cooling the block member 200 such that the fluid is cooled, and also, in addition to being provided in the block member 200, the cooling passages 110 are respectively disposed in a plurality of zones 201 that are thermally separated from each other, and a connection pipe 140 is provided such that the fluid sequentially flows through the cooling passage 110, and through this, it is possible to improve user satisfaction by securing the maximum amount of cold water by preventing heat exchange between the inflowing fluid and the outflowing fluid.

Figure 14:
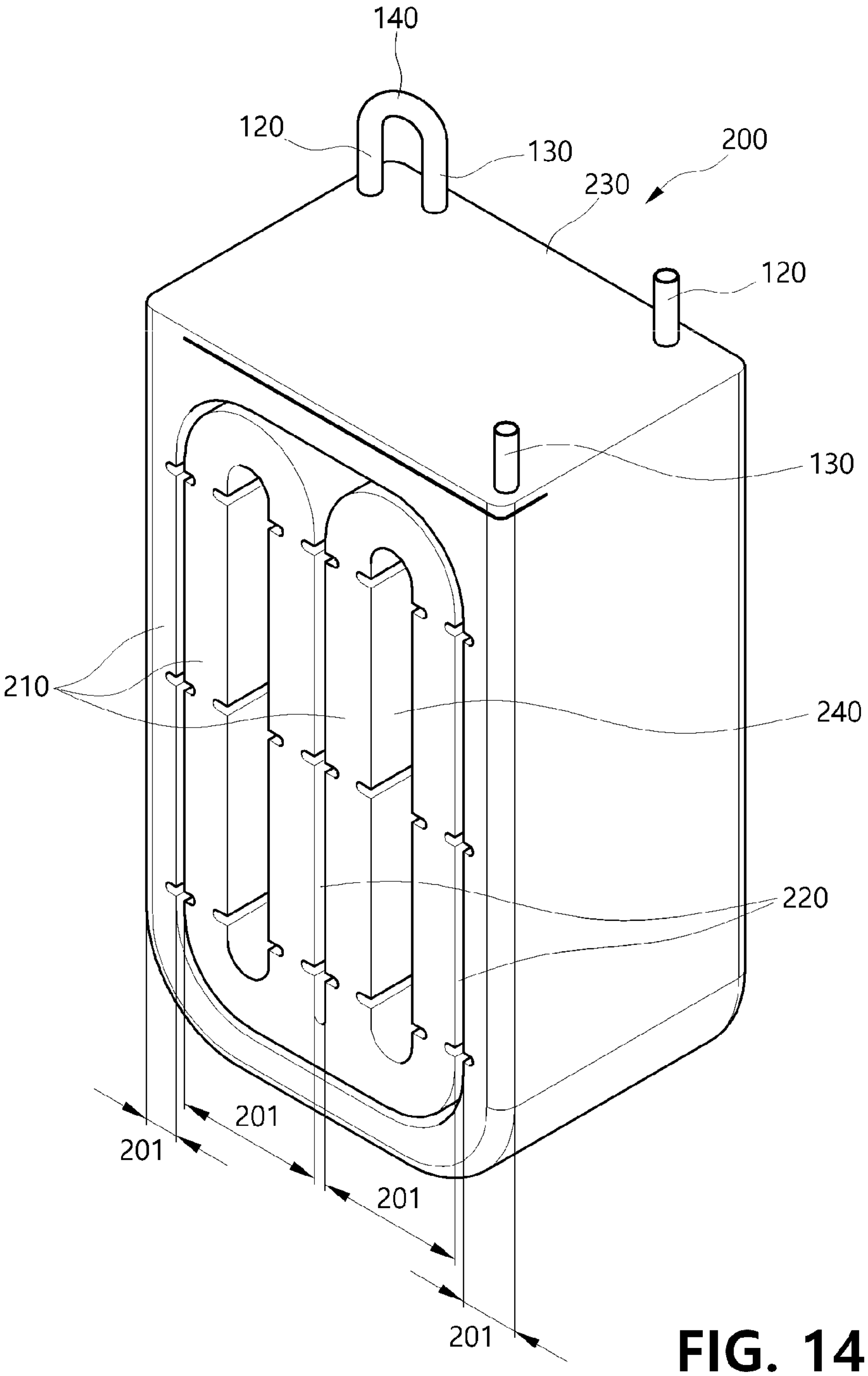
FIG. 14 is a perspective view showing a block member according to another exemplary embodiment of the present invention.
Figure 15:
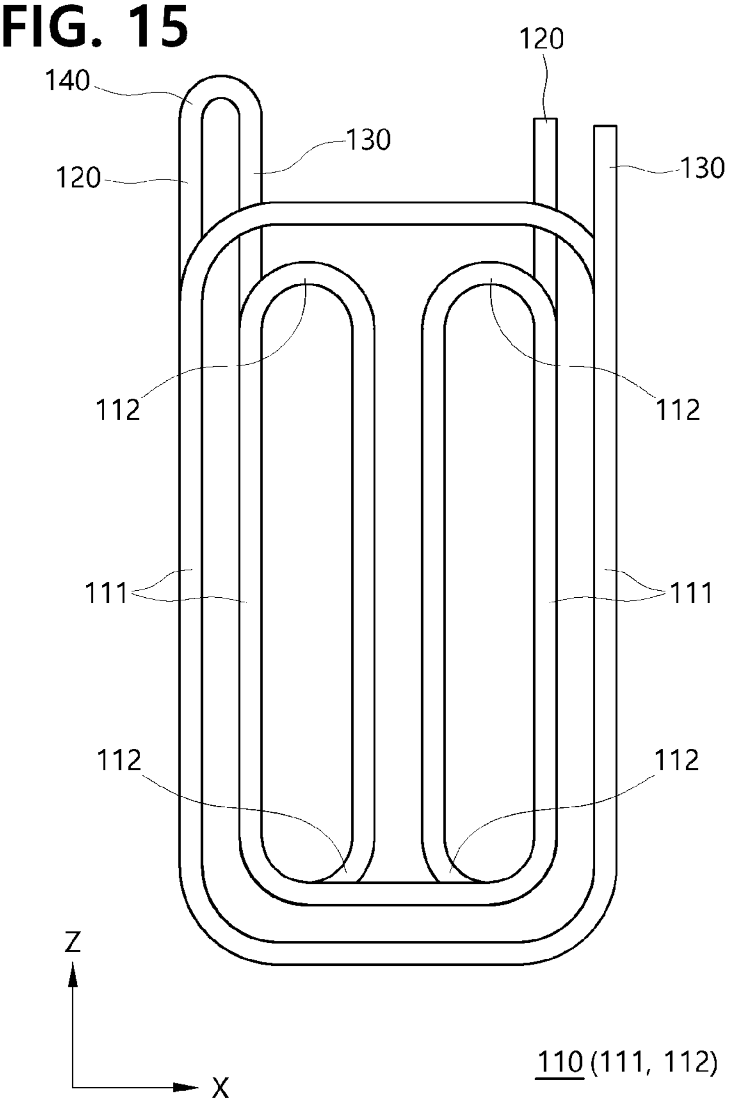
FIG. 15 is a front view showing a flow path member according to another exemplary embodiment of the present invention.

FIG. 14 is a perspective view showing a block member according to another exemplary embodiment of the present invention, and FIG. 15 is a front view showing a flow path member according to another exemplary embodiment of the present invention.

As illustrated in FIG. 14, in the apparatus for generating cold water according to another exemplary embodiment of the present invention, two zones 201 may be formed inside the block member 200, and the first separation space 220 may be formed between the two zones 201 and around the two zones 201 such that one zone 201 surrounding the periphery of these two zones 201 is formed. In addition, as illustrated in FIG. 15, the cooling passages 110 are respectively disposed in each zone 201. That is, the fluid introduced through the inlet 120 of the first cooling passage 110 that is disposed inside is cooled while flowing through the first cooling passage 110, and then moves to the second cooling passage 110 that is disposed inside, and the fluid cooled while flowing through the second cooling passage 110 is cooled while flowing through the third cooling passage 110 surrounding the periphery of the first and second cooling passages 110, and then is discharged to the outside through the outlet 130 of the third cooling passage 110. That is, even in this case, the block member 200 is disposed to surround the outer peripheral surface of the flow path member 100 through which the fluid flows, and the temperature at which the fluid is cooled can be sufficiently lowered by cooling the block member 200 to cool the fluid, and in addition to being provided in the block member 200, the cooling passages 110 are disposed in each of the plurality of zones 201 that are thermally separated from each other, and a connection pipe 140 is provided such that the fluid sequentially flows through the cooling passage 110, and through this, it is possible to improve user satisfaction by securing the maximum amount of cold water by preventing heat exchange between the inflowing fluid and the outflowing fluid.

Figure 16:
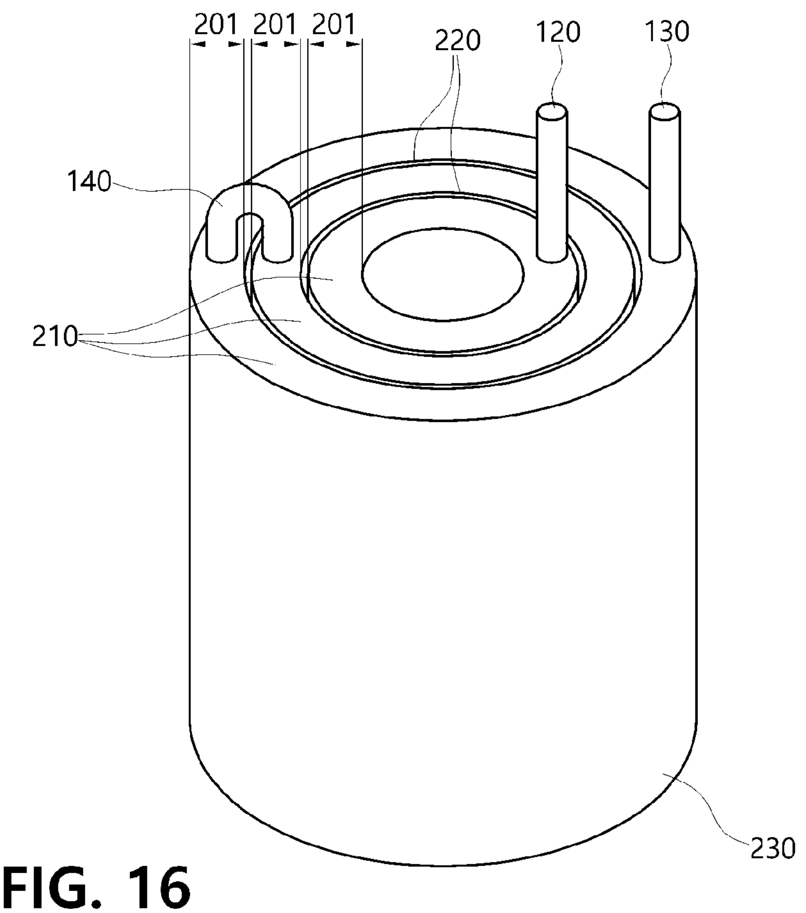
FIG. 16 is a perspective view showing a block member according to another exemplary embodiment of the present invention.
Figure 17:
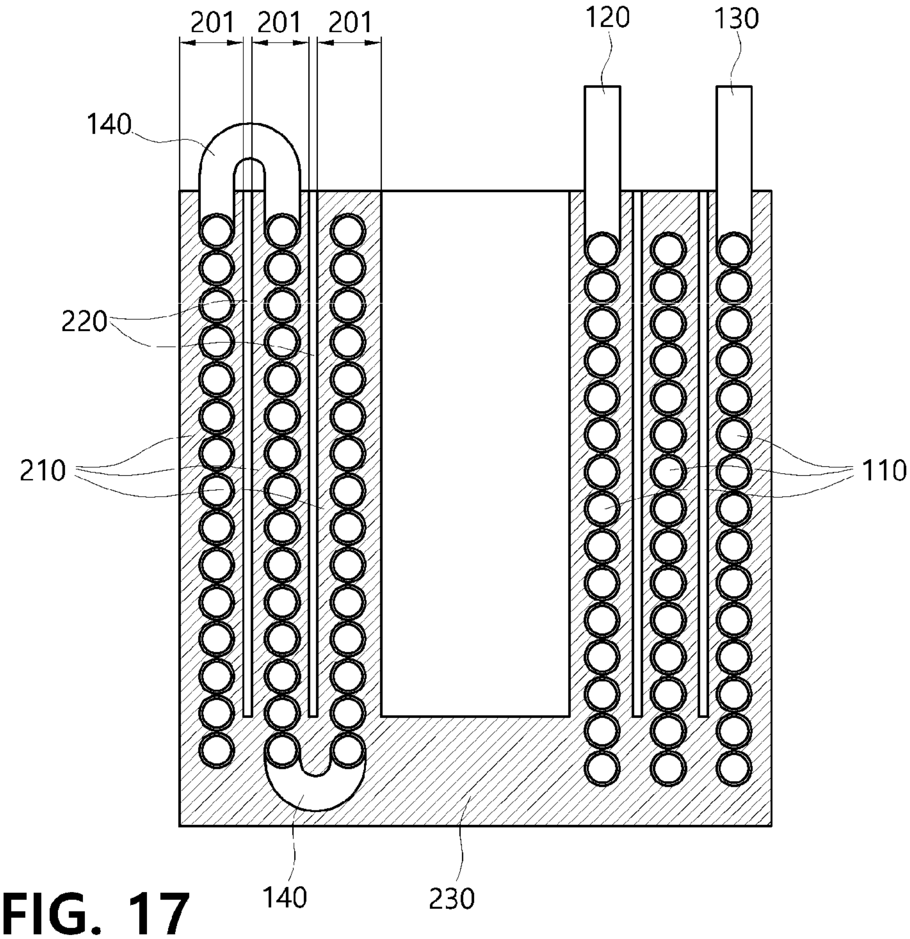
FIG. 17 is a cross-sectional view showing a flow path member according to another exemplary embodiment of the present invention.

FIG. 16 is a perspective view showing a block member according to another exemplary embodiment of the present invention, and FIG. 17 is a cross-sectional view showing a flow path member according to another exemplary embodiment of the present invention.

As illustrated in FIG. 16, in the apparatus for generating cold water according to another exemplary embodiment of the present invention, two of the first separation spaces 220 may be formed in the block member 200 such that three concentric zones 201 are formed, and as illustrated in FIG. 17, the cooling passages 110 in a helical form are respectively disposed in each zone 201. That is, the fluid introduced through the inlet 120 that is disposed on the innermost side is cooled while sequentially passing through the cooling passage 110 and then discharged to the outside through the outlet 130 that is disposed on the outermost side. That is, even in this case, by disposing the block member 200 so as to surround the outer circumferential surface of the flow path member 100 through which the fluid flows, and cooling the block member 200 such that the fluid is cooled, the temperature at which the fluid is cooled can be sufficiently lowered, and also, in addition to being provided in the block member 200, the cooling passages 110 are respectively disposed in each of the plurality of zones 201 that are thermally separated from each other, and a connection pipe 140 is provided such that fluid sequentially flows through the cooling passages 110, and through this, it is possible to improve user satisfaction by securing the maximum amount of cold water by preventing heat exchange between the inflowing fluid and the outflowing fluid.

Figure 18:
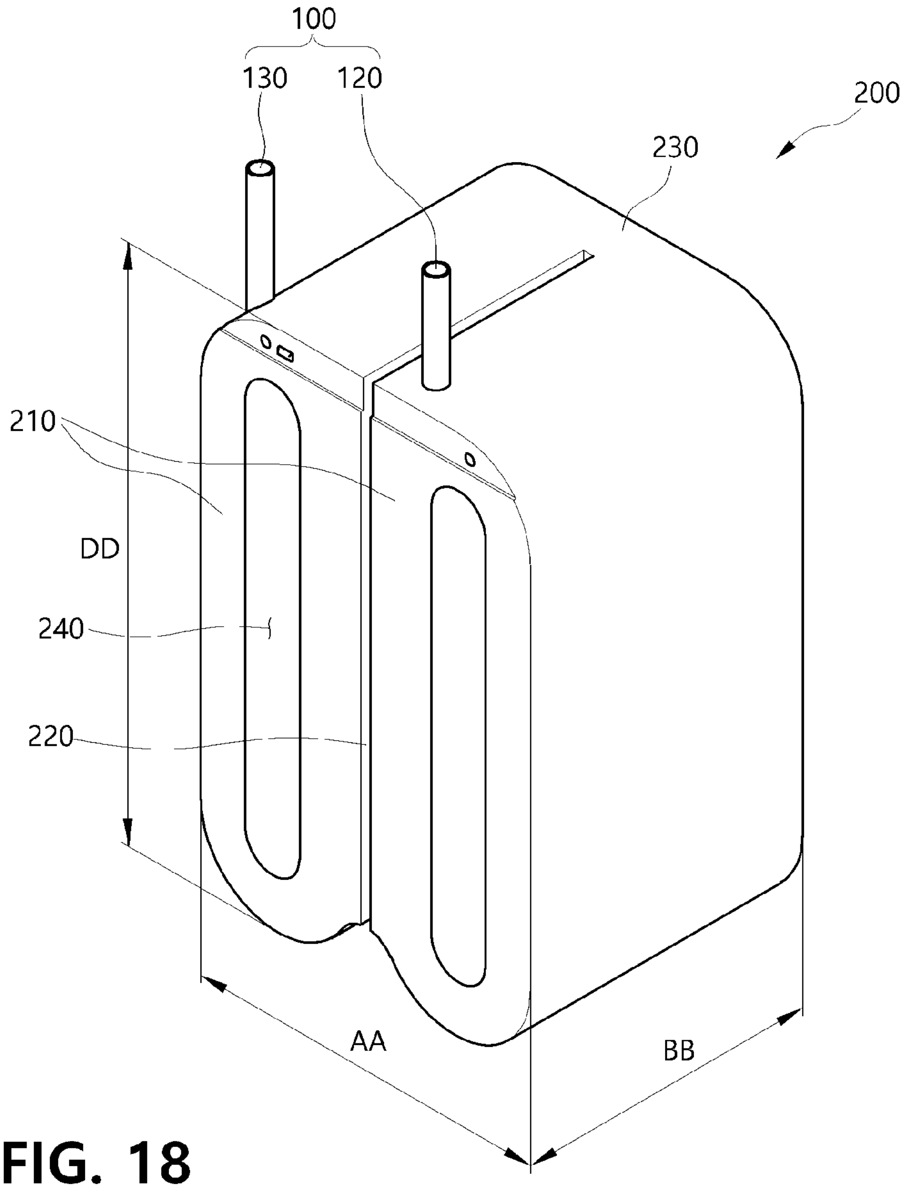
FIG. 18 is a perspective view illustrating the width direction length, depth direction length and height direction length of a block member according to an exemplary embodiment of the present invention.
Figure 19:
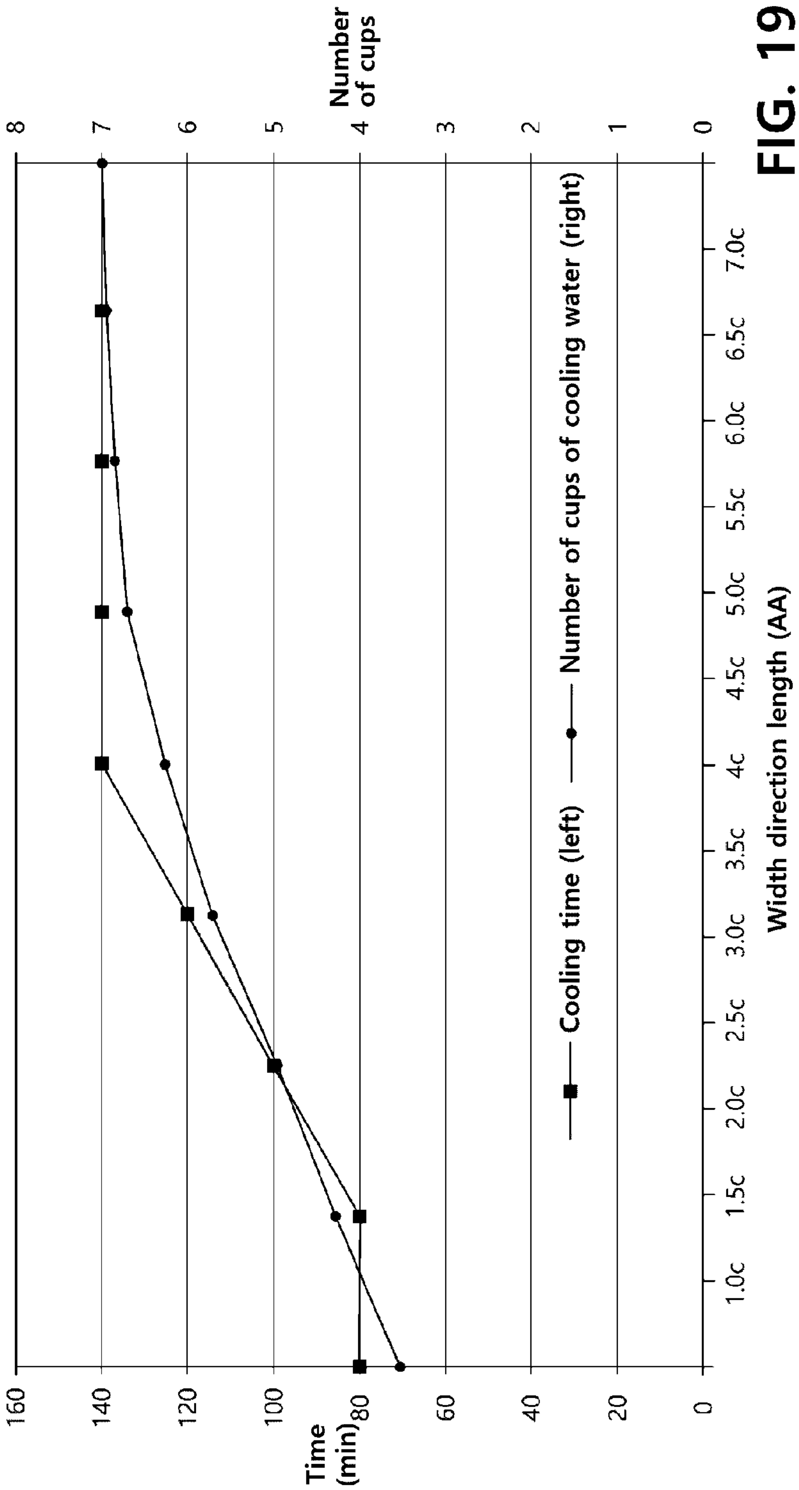
FIG. 19 is a graph showing changes in cooling time and cooling performance (number of cups) according to the width direction length of the block member according to an exemplary embodiment of the present invention.

FIG. 18 is a perspective view illustrating the width direction length, depth direction length and height direction length of a block member according to an exemplary embodiment of the present invention, and FIG. 19 is a graph showing changes in cooling time and cooling performance (number of cups) according to the width direction length of the block member according to an exemplary embodiment of the present invention.

As illustrated in FIG. 18, in the apparatus for generating cold water according to an exemplary embodiment of the present invention, the block member 200 may be formed with a width direction length AA that is formed along the width direction X, a height direction length BB that is formed along the height direction Z, and a depth direction length that is formed along the depth direction Y.

In this case, in the apparatus for generating cold water according to an exemplary embodiment of the present invention, the thermoelectric module 310 may be provided with a rectangular periphery having a width direction length A 301 and a height direction length B 303, and when the thermoelectric length C of the thermoelectric module 310 is defined by the mathematical formula of $C=\sqrt{(AB)}$, the width direction length AA of the block member 200 satisfies the range of 1.5 C<AA<4 C. That is, basically, it is preferable that the block member 200 has a size sufficient to cool the flow path member 100, but when the block member 200 is formed to be too large, not only it cannot sufficiently cool the block member 200 through the thermoelectric module 310, but also there may be a problem in that the time required to cool the block member 200 is excessively increased, and since there may be a problem in that the weight or volume of the entire apparatus is also increased excessively, the size of the block member 200 is preferably formed to correspond to the size of the thermoelectric module 310. FIG. 19 is a graph showing changes in cooling time and cooling performance (number of cups) according to the width direction length AA of the block member 200, and the x-axis represents the width direction length AA of the block member 200 as a ratio to the size of the thermoelectric module 310, the y-axis shown on the left represents the time it takes for the block member 200 to cool, and the y-axis shown on the right represents the number of cups of cold water and means cooling performance. As illustrated in FIG. 19, it can be confirmed that as the width direction length AA of the block member 200 increases, the time required to cool the block member 200 increases. This means that as the size of the block member 200 increases, the time required to cool it increases. Meanwhile, as the width direction length AA of the block member 200 increases, it can be confirmed that the number of cups of extractable cold water also increases. This is because as the size of the block member 200 increases, the size of the cooling passage 110 that is disposed inside the block member 200 increases, and thus, the amount of fluid accommodated in the cooling passage 110 also increases. Therefore, in consideration of this relationship, the width direction length AA of the block member 200 is preferably formed in the range of 1.5 C<AA<4 C. When the width direction length AA of the block member 200 is 1.5 C or less, the time required to cool the block member 200 is reduced, but only about 4 cups of the number of cups of cold water can be extracted. However, when the width direction length AA of the block member 200 is more than 1.5 C, the time required to cool the block member 200 increases, but the number of cups of extractable cold water rapidly increases, and the tendency for the number of cups of the cold water to rapidly increase is maintained until the width direction length AA of the block member 200 is less than 4 C. Meanwhile, when the width direction length AA of the block member 200 is 4 C or more, the number of cups of cold water does not increase any more, whereas only the time required for cooling continues to increase. Therefore, as described above, the width direction length AA of the block member 200 is preferably formed in the range of 1.5 C<AA<4 C. As described above, if the range of the width direction length AA of the block member 200 is formed to correspond to the size of the thermoelectric module 310, the fluid can be sufficiently cooled, and the entire apparatus can be downsized.

Figure 20:
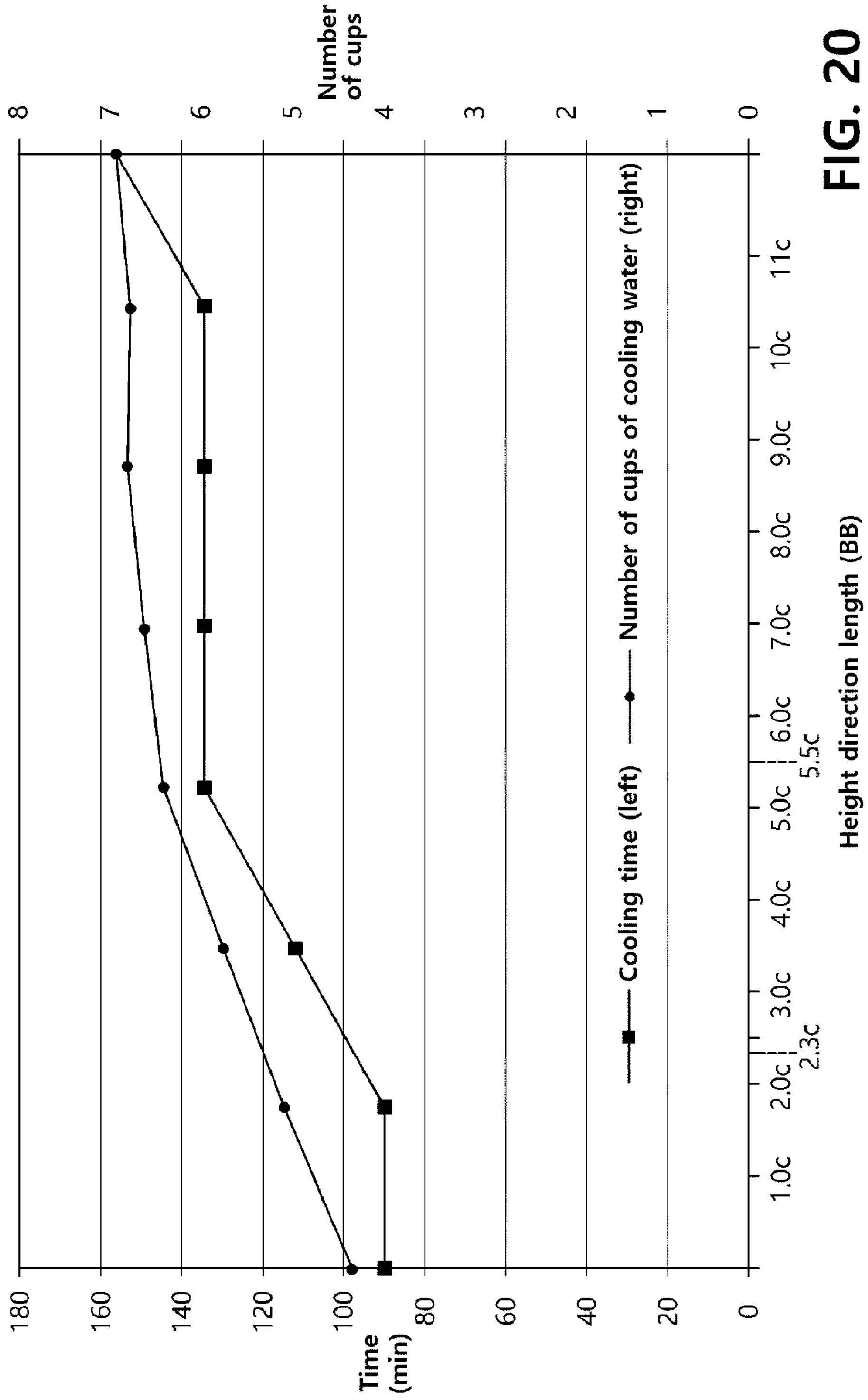
FIG. 20 is a graph showing changes in cooling time and cooling performance (number of cups) according to the height direction length of a block member according to an exemplary embodiment of the present invention.

FIG. 20 is a graph showing changes in cooling time and cooling performance (number of cups) according to the height direction length of a block member according to an exemplary embodiment of the present invention.

As illustrated in FIG. 20, in the cold-water generating apparatus according to an exemplary embodiment of the present invention, the thermoelectric module 310 may be provided with a rectangular periphery having a width direction length A 301 and a height direction length B 303, and when the thermoelectric length C of the thermoelectric module 310 is defined by the mathematical formula of $C=\sqrt{(AB)}$, the height direction length BB of the block member 200 satisfies the range of 2.3 C<BB<5.5 C. As described above, it can be confirmed that as the height direction length BB of the block member 200 increases, the time required to cool the block member 200 increases. Meanwhile, as the width direction length AA of the block member 200 increases, it can be confirmed that the number of cups of extractable cold water also increases. Therefore, in consideration of this relationship, the height direction length BB of the block member 200 is preferably formed in the range of 2.3 C<BB<5.5 C. When the height direction length BB of the block member 200 is 2.3 C or less, the time required to cool the block member 200 is reduced, but only about 4 cups of the number of cups of cold water can be extracted. However, when the height direction length BB of the block member 200 is more than 2.3 C, the time required to cool the block member 200 increases, but the number of cups of extractable cold water rapidly increases, and the tendency for the number of cups of the cold water to rapidly increase is maintained until the height direction length BB of the block member 200 is less than 5.5 C. Meanwhile, when the height direction length BB of the block member 200 is 5.5 C or more, the number of cups of cold water does not increase any more, whereas only the time required for cooling continues to increase. Therefore, as described above, the height direction length BB of the block member 200 is preferably formed in the range of 2.3 C<BB<5.5 C. As such, when the range of the height direction length BB of the block member 200 is formed to correspond to the size of the thermoelectric module 310, the fluid can be sufficiently cooled, and the entire apparatus can be downsized.

Figure 21:
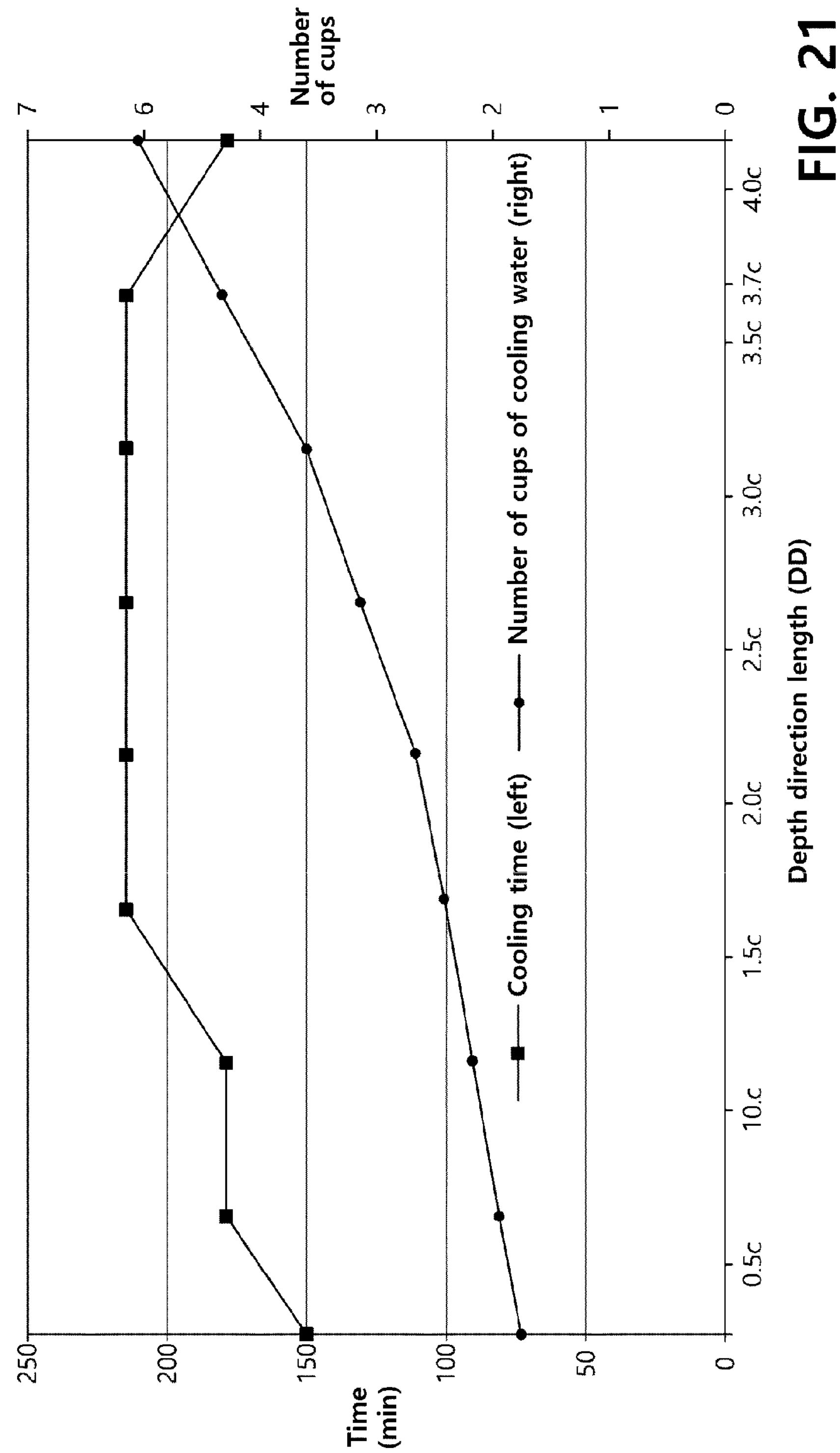
FIG. 21 is a graph illustrating changes in cooling time and cooling performance (number of cups) according to the depth direction length of a block member according to an exemplary embodiment of the present invention.

FIG. 21 is a graph illustrating changes in cooling time and cooling performance (number of cups) according to the depth direction length of a block member according to an exemplary embodiment of the present invention.

As illustrated in FIG. 21, in the apparatus for generating cold water according to an exemplary embodiment of the present invention, the thermoelectric module 310 may be provided with a rectangular periphery having a width direction length A 301 and a height direction length B 303, and when the thermoelectric length C of the thermoelectric module 310 is defined by the mathematical formula of $C=\sqrt{(AB)}$, the depth direction length DD of the block member 200 satisfies the range of $C<DD<3.7$ C. As described above, as the depth direction length DD of the block member 200 increases, it can be confirmed that the time required to cool the block member 200 increases. Meanwhile, as the depth direction length DD of the block member 200 increases, it can be confirmed that the number of cups of extractable cold water also increases. Therefore, in consideration of this relationship, the depth direction length DD of the block member 200 is preferably formed in the range of $C<DD<3.7$ C. When the depth direction length DD of the block member 200 is C or less, the time required to cool the block member 200 is reduced, but only about 4 cups of the number of cups of cold water can be extracted. However, when the depth direction length DD of the block member 200 is more than C, the time required to cool the block member 200 increases, but the number of cups of extractable cold water rapidly increases, and the tendency for the number of cups of the cold water to rapidly increase is maintained until the depth direction length DD of the block member 200 is less than 3.7 C. Meanwhile, when the depth direction length DD of the block member 200 is 3.7 C or more, the number of cups of cold water is rather reduced, and the time required for cooling continues to increase. Therefore, as described above, the depth direction length DD of the block member 200 is preferably formed in the range of $C<DD<3.7$ C. As such, when the range of the height direction length BB of the block member 200 is formed to correspond to the size of the thermoelectric module 310, the fluid can be sufficiently cooled, and the entire apparatus can be downsized.

As illustrated in FIGS. 8 and 9, the block member 200 may further include a case member 400 that is made of a heat insulating material surrounding the outer circumferential surface. As such, when the case member made of a heat insulating material surrounding the outer circumferential surface of the block member 200 is provided, it is possible to effectively prevent the cooling performance of the block member 200 from being deteriorated. In this case, the case member 400 may include a heat insulating wall 410 that is inserted into the first separation space 220. As an example, the case member 400 may be manufactured by the foam molding method, and if the foam material is configured to be naturally injected into the first separation space 220 during the foam molding process, the insulating wall 410 may be manufactured in a simple manner. The insulating wall 410 may be formed in the upper case 401 and the lower case 402, respectively. By disposing the separate insulating wall 410 between the unit blocks 210 in this way, heat exchange between the unit blocks 210 can be more effectively prevented, and it is possible to improve user satisfaction because the maximum amount of cold water can be secured.

Figure 22:
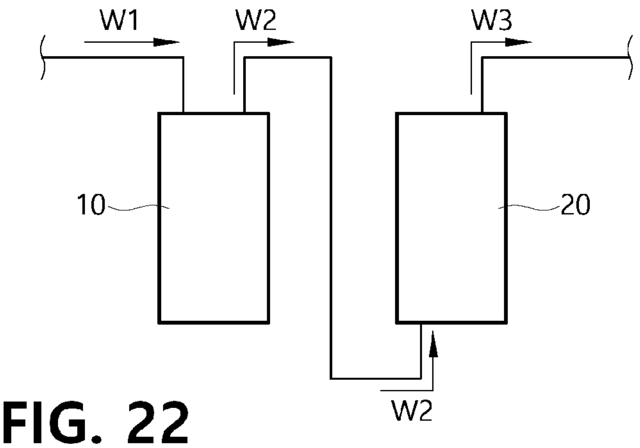
FIG. 22 is a block diagram of a water purifier according to an exemplary embodiment of the present invention.

FIG. 22 is a block diagram of a water purifier according to an exemplary embodiment of the present invention.

As illustrated in FIG. 22, the water purifier according to the present invention may include a filtering unit 10 for filtering raw water W1 to generate purified water W2, and a cold water generating unit 20 for generating cold water W3 by receiving purified water W2 from the filtering unit 10. The filtering unit 10 receives raw water W1 from the outside and then filters the raw water W1 to generate purified water W2. The filtering unit 10 may include several filters. For example, the filter unit 10 may include a pre-carbon filter, a membrane filter and an after-carbon filter. In addition, the filtering unit 10 may include an electric deionization-type filter. Electrodeionization methods refer to EDI (Electro Deionization), CEDI (Continuous Electro Deionization), CDI (Capacitive Deionization) and the like. The purified water W2 generated by the filtering unit 10 may be directly supplied to the cold water generating unit 20, or may be supplied to a separate storage unit for storing the purified water W2, and the cold water generating unit 20 may also be configured to receive purified water W2 through such a separate storage unit.

The cold water generating unit 20 may include a flow path member 1—through which a fluid flows, a block member 200 which surrounds the outer circumferential surface of the flow path member 100 to thermally contact the flow path member 100, and a cooling member 300 which is provided with a thermoelectric module 310 that is disposed on one side of the block member 200 to cool the block member 200. The flow path member 100 provides a space through which the fluid flows. The block member 200 is in thermal contact with the flow path member 100, but is provided to surround the outer circumferential surface of the flow path member 100 to improve cooling performance. As described above, the block member 200 is disposed to surround the outer circumferential surface of the flow path member 100, but in order to minimize contact resistance between the block member 200 and the flow path member 100, the block member 200 may be manufactured by using the die casting method. The cooling member 300 may include a thermoelectric module 310 that is disposed on one side of the block member 200 to cool the block member 200.

The block member 200 may include a plurality of zones 201 that are thermally separated from each other. When the plurality of zones 201 that are thermally separated from each other in this way are formed, heat exchange between the inflowing fluid and the outflowing fluid does not occur, thereby preventing the deterioration of cooling performance. In this case, the flow path member 100 may include first to n-th cooling passages 110 (herein, n is an integer of 2 or more) that are respectively disposed in the plurality of zones 210, an inlet 120 which is formed at one end of each of the cooling passages 100 and exposed to the outside of the block member 200, an outlet 130 which is formed at the other end of each of the cooling passages 110 and exposed to the outside of the block member 200, and a connection pipe 140 which connects the outlet 130 of the k-th cooling passage 110 (herein, k is an integer of 1 or more and less than or equal to n−1) and the inlet 120 of the k+1th cooling passage 100. That is, the cooling passage 110 is disposed in each thermally separated zone 201, and the inlet 120 is exposed to the outside of the block member 200 such that the fluid flows into the cooling passage 110, and as the outlet 130 is exposed to the outside of the block member 200 such that the fluid flows out of the cooling passage 110, it enables the fluid flow inside the cooling passage 110. In this case, a connection pipe 140 is provided to connect the cooling passages 110 that are thermally separated from each other. That is, by disposing the block member 200 so as to surround the outer circumferential surface of the flow path member 100 through which the fluid flows, and cooling the block member 200 such that the fluid is cooled, not only can the temperature at which the fluid is cooled sufficiently lower, but also in addition to being provided in the block member 200, the cooling passages 110 are respectively disposed in each of the plurality of zones 201 that are thermally separated from each other, and a connection pipe 140 is provided such that the fluid sequentially flows through the cooling passages 110, and through this, by preventing heat exchange between the inflowing fluid and the outflowing fluid, it is possible to improve user satisfaction because the maximum amount of cold water is secured.

Although the exemplary embodiments of the present invention have been described, the spirit of the present invention is not limited to the exemplary embodiments set forth herein. Those of ordinary skill in the art who understand the spirit of the present invention may easily propose other exemplary embodiments by modifying, changing, deleting or adding elements within the same spirit, but this will also be said to fall within the scope of the present invention.

The invention claimed is:

1. An apparatus for generating cold water, comprising:

a flow path member through which a fluid flows;

a block member which surrounds an outer circumferential surface of the flow path member to thermally contact the flow path member; and a cooling member which is provided with a thermoelectric module that is disposed on one side of the block member to cool the block member, wherein the block member comprises a plurality of zones that are thermally separated from each other wherein the flow path member comprises first to n-th cooling passages that are respectively disposed in the plurality of zones, an inlet which is formed at one end of each of the cooling passages and exposed to outside of the block member, an outlet which is formed at the other end of each of the cooling passages and exposed to outside of the block member, and a connection pipe which connects the outlet of the k-th cooling passage and the inlet of the k+1th cooling passage, wherein the block member comprises a plurality of unit blocks in which the zones are respectively formed and a first separation space in which each unit block is disposed to be spaced apart from each other by a predetermined distance, wherein in the cooling member, the thermoelectric module is disposed to overlap the first to n-th cooling passages arranged in each of the above unit blocks, n is an integer of 2 or more, and k is an integer of 1 or more and less than or equal to n−1.

2. The apparatus of claim 1, wherein the thermoelectric module is disposed on one side of the block member in a depth direction, wherein the inlet of the k-th cooling passage is disposed far from the thermoelectric module, and the outlet of the k-th cooling passage is disposed close to the thermoelectric module, and wherein the inlet of the k+1th cooling passage is disposed close to the thermoelectric module, and the outlet of the k+1th cooling passage is disposed far from the thermoelectric module.

3. The apparatus of claim 2, wherein the first separation space is disposed far from the thermoelectric module.

4. The apparatus of claim 1, wherein the thermoelectric module is disposed on one side of the block member in a depth direction, wherein the inlet of the k-th cooling passage is disposed far from the thermoelectric module, and the outlet of the k-th cooling passage is disposed close to the thermoelectric module, and wherein the inlet of the k+1th cooling passage is disposed far from the thermoelectric module, and the outlet of the k+1th cooling passage is disposed close to the thermoelectric module.

5. The apparatus of claim 1, wherein the block member comprises a connection rib that thermally interconnects one side of the unit block in a depth direction such that the cooling member simultaneously cools the plurality of unit blocks.

6. The apparatus of claim 5, wherein the cooling member comprises at least one thermoelectric module, and wherein the number of thermoelectric modules is less than the number of unit blocks.

7. The apparatus of claim 1, wherein the cooling passage comprises a straight passage through which the fluid flows in a straight direction and a curved passage through which the fluid flows in a curved direction, and the cooling passage is wound at least once such that the fluid sequentially flows through the straight passage and the curved passage.

8. The apparatus of claim 7, wherein the block member comprises a straight block surrounding an outer circumferential surface of the straight passage, a curved block surrounding an outer circumferential surface of the curved passage, and a second separation space that spaces apart the straight block and the curved block that are disposed to face each other.

9. The apparatus of claim 1, wherein the cooling passages are stacked in a helical shape.

10. The apparatus of claim 1, wherein the thermoelectric module is provided with a rectangular periphery having a width direction length (A) and a height direction length (B), and wherein when the thermoelectric length (C) of the thermoelectric module is defined by the mathematical formula below:

$$C=\sqrt{(AB)}$$

the width direction length (AA) of the block member satisfies the following range:

$$1.5C<AA<4C.$$

11. The apparatus of claim 1, wherein the thermoelectric module is provided with a rectangular periphery having a width direction length (A) and a height direction length (B), and wherein when the thermoelectric length (C) of the thermoelectric module is defined by the mathematical formula below:

$$C=\sqrt{(AB)}$$

the height direction length (BB) of the block member satisfies the following range:

$$2.3C<BB<5.5C.$$

12. The apparatus of claim 1, wherein the thermoelectric module is provided with a rectangular periphery having a width direction length (A) and a height direction length (B), and wherein when the thermoelectric length (C) of the thermoelectric module is defined by the mathematical formula below:

$$C=\sqrt{(AB)}$$

the depth direction length (DD) of the block member satisfies the following range:

$$C<DD<3.7C.$$

13. The apparatus of claim 1, further comprising:

a case member which is made of an insulating material surrounding an outer circumferential surface of the block member.

14. The apparatus of claim 13, wherein the case member comprises a heat insulating wall that is inserted and disposed into the first separation space.

15. A water purifier, comprising:

a filtering unit for filtering raw water to generate purified water; and a cold water generating unit for generating cold water by receiving the purified water from the filtering unit, wherein the cold water generating unit comprises a flow path member through which a fluid flows, a block member which surrounds an outer circumferential surface of the flow path member to thermally contact the flow path member, and a cooling member which is provided with a thermoelectric module that is disposed on one side of the block member to cool the block member, wherein the block member comprises a plurality of zones that are thermally separated from each other, wherein the flow path member comprises first to n-th cooling passages that are respectively disposed in the plurality of zones, an inlet which is formed at one end of each of the cooling passages and exposed to outside of the block member, an outlet which is formed at the other end of each of the cooling passages and exposed to outside of the block member, and a connection pipe which connects the outlet of the k-th cooling passage and the inlet of the k+1th cooling passage, wherein the block member comprises a plurality of unit blocks in which the zones are respectively formed and a first separation space in which each unit block is disposed to be spaced apart from each other by a predetermined distance, wherein in the cooling member, the thermoelectric module is disposed to overlap the first to n-th cooling passages arranged in each of the above unit blocks, n is an integer of 2 or more, and k is an integer of 1 or more and less than or equal to n−1.

* * * * *